US012486716B2

(12) United States Patent
Burlew et al.

(10) Patent No.: US 12,486,716 B2
(45) Date of Patent: Dec. 2, 2025

(54) CONTROLLING A POSITION OF A COVERING MATERIAL OF A BATTERY-POWERED MOTORIZED WINDOW TREATMENT

(71) Applicant: Lutron Technology Company LLC, Coopersburg, PA (US)

(72) Inventors: Jackson Burlew, Bethlehem, PA (US); Robert Jesse Thompson, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 323 days.

(21) Appl. No.: 18/083,476

(22) Filed: Dec. 17, 2022

(65) Prior Publication Data
US 2023/0193691 A1    Jun. 22, 2023

Related U.S. Application Data

(60) Provisional application No. 63/299,662, filed on Jan. 14, 2022, provisional application No. 63/290,934, filed on Dec. 17, 2021.

(51) Int. Cl.
*E06B 9/72* (2006.01)
*G05B 15/02* (2006.01)
*E06B 9/68* (2006.01)

(52) U.S. Cl.
CPC .............. *E06B 9/72* (2013.01); *G05B 15/02* (2013.01); *E06B 9/68* (2013.01); *E06B 2009/6827* (2013.01); *E06B 2009/6845* (2013.01)

(58) Field of Classification Search
CPC .............. E06B 9/72; E06B 2009/6827; E06B 2009/6845; E06B 2009/6809; E06B 9/68; G05B 15/02
See application file for complete search history.

(56) References Cited

U.S. PATENT DOCUMENTS

| 5,848,634 | A | * | 12/1998 | Will | ......... E06B 9/70 160/310 |
|---|---|---|---|---|---|
| 7,281,565 | B2 | | 10/2007 | Carmen et al. | |
| 7,537,040 | B2 | | 5/2009 | Carmen et al. | |
| 7,635,018 | B2 | | 12/2009 | Carmen et al. | |
| 7,737,653 | B2 | | 6/2010 | Carmen et al. | |
| 7,839,109 | B2 | | 11/2010 | Carmen et al. | |

(Continued)

*Primary Examiner* — Phi D A
(74) *Attorney, Agent, or Firm* — Flaster Greenberg P.C.

(57) ABSTRACT

As described herein, a motorized window treatment may be configured to synchronize its covering material with other motorized window treatments if movement of the covering material has been delayed. The motor drive unit may receive a message including a command via wireless signals, and rotate a roller tube to adjust a present position of the covering material at an increased rate in response to determining that adjustment of the covering material in response to the command is delayed. The control circuit may determine a delay time between when the other motorized window treatments began to move and when the motor drive unit begins to move in response to the command. The control circuit may begin adjusting the present position of the covering material at a nominal rate in response to determining that the covering material is synchronized with the other motorized window treatments using the determined delay time.

27 Claims, 8 Drawing Sheets

(56) References Cited

U.S. PATENT DOCUMENTS

| | | | |
|---|---|---|---|
| 10,041,292 B2 | 8/2018 | Cooney et al. | |
| 11,425,811 B2 | 8/2022 | Petersen et al. | |
| 2011/0240232 A1* | 10/2011 | Kluck | E05F 15/79 160/5 |
| 2012/0048490 A1* | 3/2012 | Feldstein | E06B 9/42 160/405 |
| 2012/0050596 A1 | 3/2012 | Feldstein et al. | |
| 2014/0163742 A1* | 6/2014 | Element | E06B 9/322 700/275 |
| 2014/0224437 A1* | 8/2014 | Colson | E06B 9/78 160/311 |
| 2014/0367057 A1* | 12/2014 | Feldstein | E06B 9/68 160/405 |
| 2015/0355608 A1* | 12/2015 | Krenz | G05B 19/042 700/275 |
| 2017/0260806 A1* | 9/2017 | Adams | E06B 9/32 |
| 2018/0106100 A1* | 4/2018 | Foley | E06B 9/32 |
| 2018/0116040 A1* | 4/2018 | Mann | H05B 47/196 |
| 2018/0364665 A1* | 12/2018 | Clymer | G05B 19/042 |
| 2019/0032404 A1* | 1/2019 | Chacon | E06B 9/72 |
| 2019/0218859 A1* | 7/2019 | Campagna | E06B 9/90 |
| 2020/0033817 A1 | 1/2020 | Rebbert et al. | |
| 2022/0341259 A1* | 10/2022 | Chacon | E06B 9/42 |
| 2023/0151690 A1* | 5/2023 | Menendez | E06B 9/42 318/255 |
| 2023/0203883 A1* | 6/2023 | Hebeisen | E06B 9/68 160/6 |

* cited by examiner

CONTROLLING A POSITION OF A COVERING MATERIAL OF A BATTERY-POWERED MOTORIZED WINDOW TREATMENT

CROSS-REFERENCE TO RELATED APPLICATIONS

This application claims the benefit of Provisional U.S. Patent Application No. 63/290,934, filed Dec. 17, 2021, and Provisional U.S. Patent Application No. 63/299,662, filed Jan. 14, 2022, the entire disclosures of which are hereby incorporated by reference herein in their entirety.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and cooling (HVAC) system may be used to control the temperature in the user environment. Each load control system may include various control devices, including control-source devices and control-target devices. The control-target devices may receive messages (e.g., digital messages), which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an plug-in load control device, and/or the like. Examples of control-source devices may include remote control devices, occupancy sensors, daylight sensors, temperature sensors, and/or the like.

SUMMARY

As described herein, a motorized window treatment of a load control system may be configured to synchronize the movement and/or position of a covering material with covering materials of other motorized window treatments in the load control system if movement of the covering material has been delayed. The motorized window treatment may comprise a roller tube to which the covering material is attached, such that the covering material is operable between a raised position and a lowered position via rotation of the roller tube.

The motor drive unit may comprise a motor configured to rotate the roller tube to adjust a present position of the covering material between the raised position and the lowered position, a communication circuit configured to receive wireless signals, and a control circuit. The control circuit may receive a message including a command via the wireless signals received by the communication circuit, and control the motor to adjust the present position of the covering material at a nominal rate in response to the command. The control circuit may determine that an adjustment of the covering material in response to the command is delayed with respect to other motorized window treatments of the load control system, and adjust the present position of the covering material at an increased rate in response to determining that the adjustment of the covering material in response to the command is delayed. The control circuit may begin adjusting the present position of the covering material at the nominal rate in response to the covering material becoming synchronized with the other motorized window treatments after adjusting the present position of the covering material at the increased rate.

The control circuit may also be configured to determine a delay time between when the other motorized window treatments began to adjust the covering material and when the motor drive unit will begin to adjust the covering material in response to the command in the received message. The control circuit may determine that the covering material is synchronized with the other motorized window treatments using the determined delay time, and adjust the present position of the covering material at the nominal rate in response to determining that the covering material is synchronized with the other motorized window treatments. In addition, the control circuit may begin adjusting the present position of the covering material at the nominal rate at a time based on the determined delay time. Further, the control circuit may be configured to determining a synchronization period based on the delay time and an increased rate, adjust the present position of the covering material at the increased rate for the synchronization period in response to determining that the adjustment of the covering material in response to the command is delayed, and adjust the present position of the covering material at the nominal rate at the end of the synchronization period.

DETAILED DESCRIPTION

Figure 1:
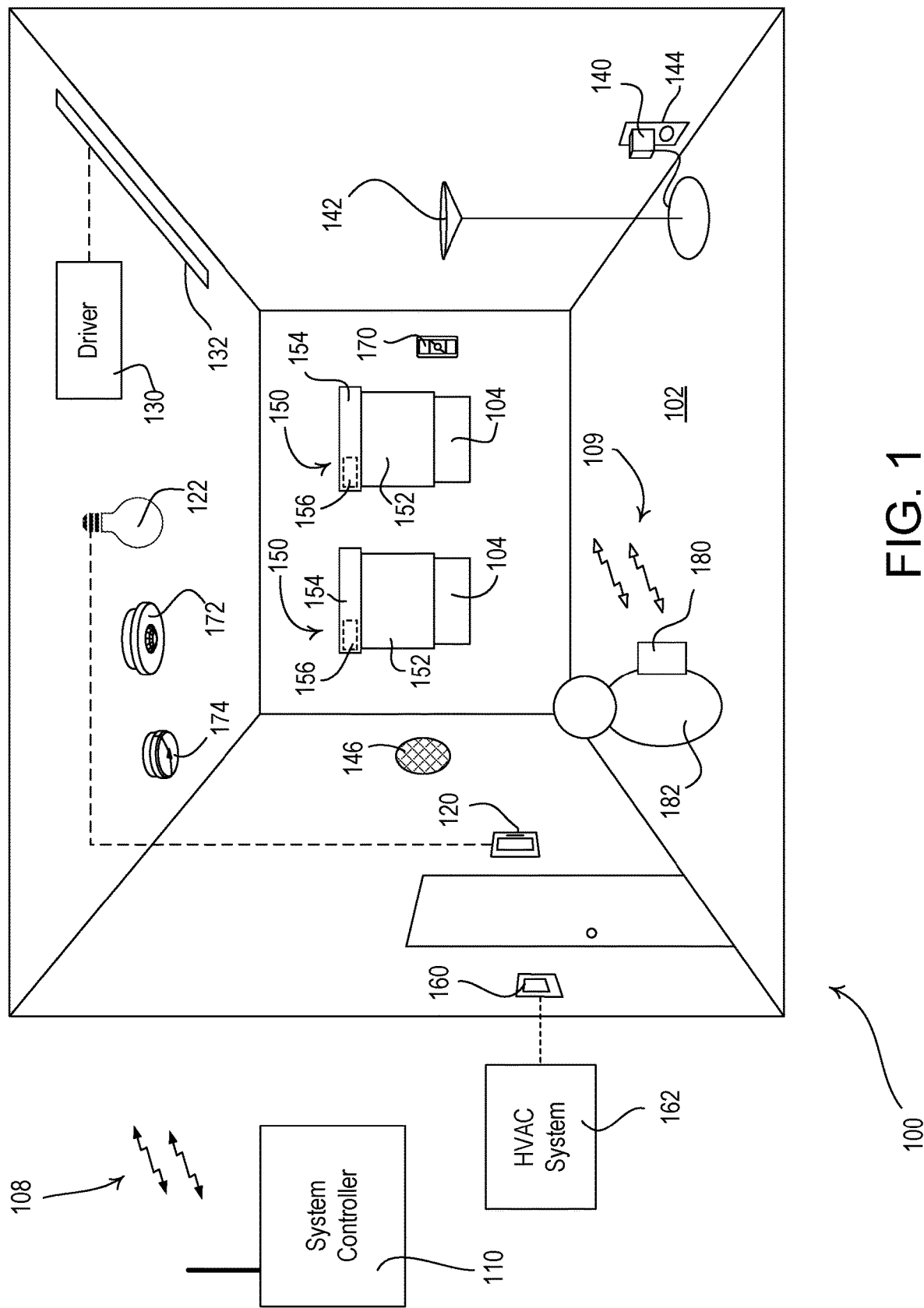
FIG. 1 is a diagram of an example load control system.

FIG. 1 is a diagram of an example load control system 100 for controlling an amount of power delivered from a power source (not shown), such as an alternating-current (AC) power source or a direct-current (DC) power source, to one or more electrical loads. The load control system 100 may be installed in a room 102 of a building. The load control system 100 may comprise a plurality of control devices configured to communicate with each other by transmitting and receiving messages (e.g., digital messages) via wireless signals, e.g., radio-frequency (RF) signals 108. Alternatively or additionally, the load control system 100 may comprise a wired digital communication link coupled to one or more of the control devices to provide for communication between the control devices. The control devices of the load control system 100 may comprise a number of control-source devices (e.g., input devices operable to transmit messages in response to user inputs, occupancy/vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) configured to communicate messages to and from the control devices (e.g., the control-source devices and/or the control-target devices). For example, the system controller 110 may be configured to receive messages from the control-source devices and transmit messages to the control-target devices in response to the messages received from the control-source devices.

The load control system 100 may comprise one or more load control devices, such as a dimmer switch 120 (e.g., a control-target device) for controlling a lighting load 122. The dimmer switch 120 may be configured to control an amount of power delivered from the AC power source to the lighting load to adjust an intensity level and/or a color (e.g., a color temperature) of the lighting load. The dimmer switch 120 may be adapted to be wall-mounted in a standard electrical wallbox. The dimmer switch 120 may also comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which are arranged in a linear array and are illuminated to provide feedback of the intensity of the lighting load 122. Examples of wall-mounted dimmer switches are described in greater detail in U.S. Pat. No. 9,679,696, issue Jun. 13, 2017, entitled WIRELESS LOAD CONTROL DEVICE, the entire disclosure of which is hereby incorporated by reference.

The dimmer switch 120 may be configured to wirelessly receive messages via the RF signals 108 (e.g., from the system controller 110) and to control the lighting load 122 in response to the received messages. Examples of dimmer switches and other control devices configured to transmit and receive messages are described in greater detail in commonly-assigned U.S. Pat. No. 10,041,292, issued Aug. 7, 2018, entitled LOW-POWER RADIO-FREQUENCY RECEIVER, and U.S. Pat. No. 10,271,407, issued Apr. 23, 2019, entitled LOAD CONTROL DEVICE HAVING INTERNET CONNECTIVITY, the entire disclosures of which are hereby incorporated by reference.

The load control system 100 may comprise one or more remotely-located load control devices, such as a light-emitting diode (LED) driver 130 (e.g., a control-target device) for driving an LED light source 132 (e.g., an LED light engine). The LED driver 130 may be located remotely, for example, in or adjacent to the lighting fixture of the LED light source 132. The LED driver 130 may be configured to receive messages via the RF signals 108 (e.g., from the system controller 110) and to control the LED light source 132 in response to the received messages. The LED driver 130 may be configured to adjust the color temperature of the LED light source 132 in response to the received messages. The load control system 100 may further comprise other types of remotely-located load control devices, such as, for example, electronic dimming ballasts for driving fluorescent lamps.

The load control system 100 may comprise a plug-in load control device 140 (e.g., a control-target device) for controlling a plug-in electrical load, e.g., a plug-in lighting load (e.g., such as a floor lamp 142 or a table lamp) and/or an appliance (e.g., such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 (e.g., from the system controller 110) and to turn on and off or adjust the intensity of the floor lamp 142 in response to the received messages. Alternatively or additionally, the load control system 100 may comprise controllable receptacles (e.g., control-target devices) for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150 (e.g., control-target devices), such as motorized roller shades, for controlling the amount of daylight entering the room 102. Each motorized window treatment 150 may comprise a covering material 152 (e.g., a window treatment fabric) hanging from a roller tube 154 in front of a respective window 104. The covering material 152 may be wound around and unwound from the roller tube 154 for respectively raising and lowering the covering material 152. Each motorized window treatment 150 may further comprise a motor drive unit 156 located inside of the roller tube 154 and having a motor for rotating the roller tube 154 to raise and lower the covering material 152 for controlling the amount of daylight entering the room 102. The motor drive units 156 may be configured to adjust a present position $P_{PRES}$ of the respective covering material 152 between a fully-raised position $P_{FULLY-RAISED}$ (e.g., a fully-open position) and a fully-lowered position $P_{FULLY-LOWERED}$ (e.g., a fully-closed position). The motor drive units 156 of each of the motorized window treatments 150 may be configured to receive messages via the RF signals 108 (e.g., from the system controller 110) and adjust the present position $P_{PRES}$ of the respective covering material 152 in response to the received messages. The motor drive unit 156 of each of the motorized window treatments 150 may be battery-powered or may be coupled to an external alternating-current (AC) or direct-current (DC) power source. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 10,494,864, issued Dec. 3, 2019, entitled MOTORIZED WINDOW TREATMENT, the entire disclosure of which is hereby incorporated by reference.

The motor drive units 156 of the respective motorized window treatments 150 may be configured to rotate the respective roller tubes 154 at a respective rotational speed to move the covering materials 152 (e.g., bottom ends of the covering materials) at the same linear speed, such that the positions of the covering materials 152 may remained aligned even when the diameters of the respective roller tubes 154 are different (e.g., particularly when the motorized window treatment 150 are mounted adjacent to each other as shown in FIG. 1). For example, if the diameters of the respective roller tubes 154 are the same, the motor drive units 156 of the respective motorized window treatments 150 may rotate their respective roller tubes 154 at the same rotational speed to move the covering materials 152 (e.g., bottom ends of the covering materials) at the same linear speed. However, if diameters of the respective roller tubes 154 are different, the motor drive units 156 may rotate their respective roller tubes 154 at a rotational speed that is based on the diameter of their respective roller tube 154 to move the covering materials 152 (e.g., bottom ends of the covering materials) at the same linear speed. The linear speed of the covering material 152 of a motorized window treatments 150 may refer to the speed at which the bottom end of the covering material moves (e.g., vertically) toward or away from the roller tube 154. The linear speed v of the covering material 152 each of the motorized window treatments 150 may be a function of the rotational speed w and the diameter d of the roller tube 154, e.g., $$v = 1/2 \cdot d \cdot \omega.$$

Each of the motor drive units 156 of the motorized window treatments 150 may take into account the diameter d of the respective roller tube 154 and control the rotational speed @ of the respective motor, such that the linear speed v of the covering material 152 of each of the motorized window treatments 150 may be the same.

Each of the motor drive units 156 may also take into account an amount of the respective covering material 152 wrapped around each of the roller tubes 154 when determining the rotational speed ω at which to rotate the respective motor such that the linear speed v of the covering material 152 of each of the motorized window treatments 150 may be the same. For example, the linear speed v of the covering material 152 each of the motorized window treatments 150 may be a function of the rotational speed ω, the diameter d of the roller tube 154, a thickness/of the covering material 152, and a number N of full rotations of the covering material 152 that are presently wound around the roller tube 154, e.g., $$v = 1/2 \cdot [d + (2 \cdot t \cdot N)] \cdot \omega.$$

Each of the motor drive units 156 may update the number N of full rotations of the covering material 152 that are wound around the roller tube 154 as the roller tube 154 is rotated to move the covering material 152 between the fully-raised position $P_{FULLY-RAISED}$ and the fully-lowered position $P_{FULLY-LOWERED}$. Each of the motor drive units 156 may adjust the rotational speed @ of the respective roller tube 156 such that the linear speed v of the covering material may be constant between the fully-raised position $P_{FULLY-RAISED}$ and the fully-lowered position $P_{FULLY-LOWERED}$ (e.g., the rotational speed ω is not constant between the fully-raised position $P_{FULLY-RAISED}$ and the fully-lowered position $P_{FULLY-LOWERED}$ and is a function of the number N of full rotations of the covering material 152 that are presently wound around the roller tube 154). Examples of motor drive units configured to the rotational speed of a motor while taking into account the diameter of the roller tube 154 and the amount of the covering material 152 wrapped around each of the roller tube 154 are described in greater detail in U.S. Pat. No. 7,281,565, issue Oct. 16, 2007, entitled SYSTEM FOR CONTROLLING ROLLER TUBE ROTATIONAL SPEED FOR CONSTANT LINEAR SHADE SPEED, the entire disclosure of which is hereby incorporated by reference.

The load control system 100 may comprise one or more temperature control devices, e.g., a thermostat 160 (e.g., a control-target device) for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. For example, the thermostat 160 and the wireless temperature sensors may be battery-powered. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102.

The load control system 100 may comprise one or more input devices (e.g., control-source devices), such as a remote control device 170, an occupancy sensor 172, and/or a daylight sensor 174. The input devices may be fixed or movable input devices. The remote control device 170, the occupancy sensor 172, and/or the daylight sensor 174 may be wireless control devices (e.g., RF transmitters) configured to transmit messages via the RF signals 108 to the system controller 110 (e.g., directly to the system controller). The system controller 110 may be configured to transmit one or more messages to the load control devices (e.g., the dimmer switch 120, the LED driver 130, the plug-in load control device 140, the motorized window treatments 150, and/or the thermostat 160) in response to the messages received from the remote control device 170, the occupancy sensor 172, and/or the daylight sensor 174. The remote control device 170, the occupancy sensor 172, and/or the daylight sensor 174 may be configured to transmit messages directly to the dimmer switch 120, the LED driver 130, the plug-in load control device 140, the motorized window treatments 150, and the temperature control device 160.

The remote control device 170 may be configured to transmit messages to the system controller 110 via the RF signals 108 in response to an actuation of one or more buttons of the remote control device. For example, the remote control device 170 may be battery-powered. Examples of remote control devices are described in greater detail in commonly-assigned U.S. Pat. No. 9,361,790, issued Jun. 7, 2016, entitled REMOTE CONTROL FOR A WIRELESS LOAD CONTROL SYSTEM, and U.S. Pat. No. 9,633,557, issued Apr. 25, 2017, entitled BATTERY-POWERED RETROFIT REMOTE CONTROL DEVICE, the entire disclosures of which are hereby incorporated by reference.

The occupancy sensor 172 may be configured to detect occupancy and vacancy conditions in the room 102 (e.g., the room in which the occupancy sensors are mounted). For example, the occupancy sensor 172 may be battery-powered. The occupancy sensor 172 may transmit digital messages to the system controller 110 via the RF signals 108 in response to detecting the occupancy or vacancy conditions. The system controller 110 may be configured to turn the lighting loads (e.g., lighting load 122 and/or the LED light source 132) on and off in response to receiving an occupied command and a vacant command, respectively. The occupancy sensor 172 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING, the entire disclosure of which is hereby incorporated by reference.

The daylight sensor 174 may be configured to measure a total light intensity in the room 102 (e.g., the room in which the daylight sensor is installed). For example, the daylight sensor 174 may be battery-powered. The daylight sensor 174 may transmit digital messages (e.g., including the measured light intensity) to the system controller 110 via the RF signals 108 for controlling the intensities of the lighting load 122 and/or the LED light source 132 in response to the measured light intensity. Examples of RF load control systems having daylight sensors are described in greater detail in commonly-assigned U.S. Pat. No. 8,451,116, issued May 28, 2013, entitled WIRELESS BATTERY-POWERED DAYLIGHT SENSOR, the entire disclosure of which is hereby incorporated by reference.

Each of the input devices (e.g., the system controller 110, the remote control device 170, the occupancy sensor 172, and/or the daylight sensor 174) may be configured to transmit a message to the load control devices (e.g., the dimmer switch 120, the LED driver 130, the plug-in load control device 140, the motorized window treatments 150, and/or the thermostat 160) multiple times during a transmission event. For example, each of the messages of a transmission event may include the same command for controlling one or more of the load control devices. The input devices may be configured to transmit the messages periodically (e.g., at a transmission period $T_{TX}$) during the transmission event. The load control devices that are battery-powered (e.g., the motorized window treatments 150) may be configured to periodically wake up from a sleep state (e.g., at a wake-up period $T_{WAKE-UP}$) to determine if one of the multiple messages of the transmission event is being transmitted. The transmission period $T_{TX}$ and the wake-up period $T_{WAKE-UP}$ may be sized such that each of the load control devices (e.g., the motorized window treatments 150) may not receive each of the multiple messages of the transmission event, but such that most of the load control devices may have received at least one of the messages when a first number, e.g., a first partial number $N_{PART}$, of the multiple messages of the transmission event have been transmitted. Each of the motorized window treatments may wait until the first partial number $N_{PART}$ of the multiple messages of the transmission event have been transmitted before responding to the command. For example, the motorized window treatments may begin adjusting the present positions $P_{PRES}$ of the respective covering materials at a time (e.g., a coordinated action time) that is based on the time at which the first partial number $N_{PART}$ of the multiple messages of the transmission event have been transmitted (e.g., immediately following when the first partial number $N_{PART}$ of the multiple messages of the transmission event have been transmitted).

The system controller 110 may be configured to be coupled to a network, such as a wireless or wired local area network (LAN), e.g., for access to the Internet. The system controller 110 may be wirelessly connected to the network. The system controller 110 may be coupled to the network via a network communication bus (e.g., an Ethernet communication link). The system controller 110 may be configured to communicate via the network with one or more network devices, e.g., a mobile device 180, such as, a personal computing device and/or a wearable wireless device. The mobile device 180 may be located on an occupant 182, for example, may be attached to the occupant's body or clothing or may be held by the occupant. The mobile device 180 may be characterized by a unique identifier (e.g., a serial number or address stored in memory) that uniquely identifies the mobile device 180 and thus the occupant 182. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 180 may be configured to transmit digital messages via RF signals 109 to the system controller 110, for example, in one or more Internet Protocol packets. For example, the mobile device 180 may be configured to transmit digital messages to the system controller 110 over the LAN and/or via the Internet. The mobile device 180 may be configured to transmit digital messages over the internet to an external service, and then the digital messages may be received by the system controller 110. The load control system 100 may comprise other types of network devices coupled to the network, such as a desktop personal computer (PC), a wireless-communication-capable television, or any other suitable Internet-Protocol-enabled device.

The operation of the load control system 100 may be programmed and configured using, for example, the mobile device 180 or other network device (e.g., when the mobile device is a personal computing device). The mobile device 180 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the occupancy sensor 172, and/or the daylight sensor 174). The load control database may comprise information regarding how the load control devices respond to inputs received from the input devices. Examples of configuration procedures for load control systems are described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

Figure 2:
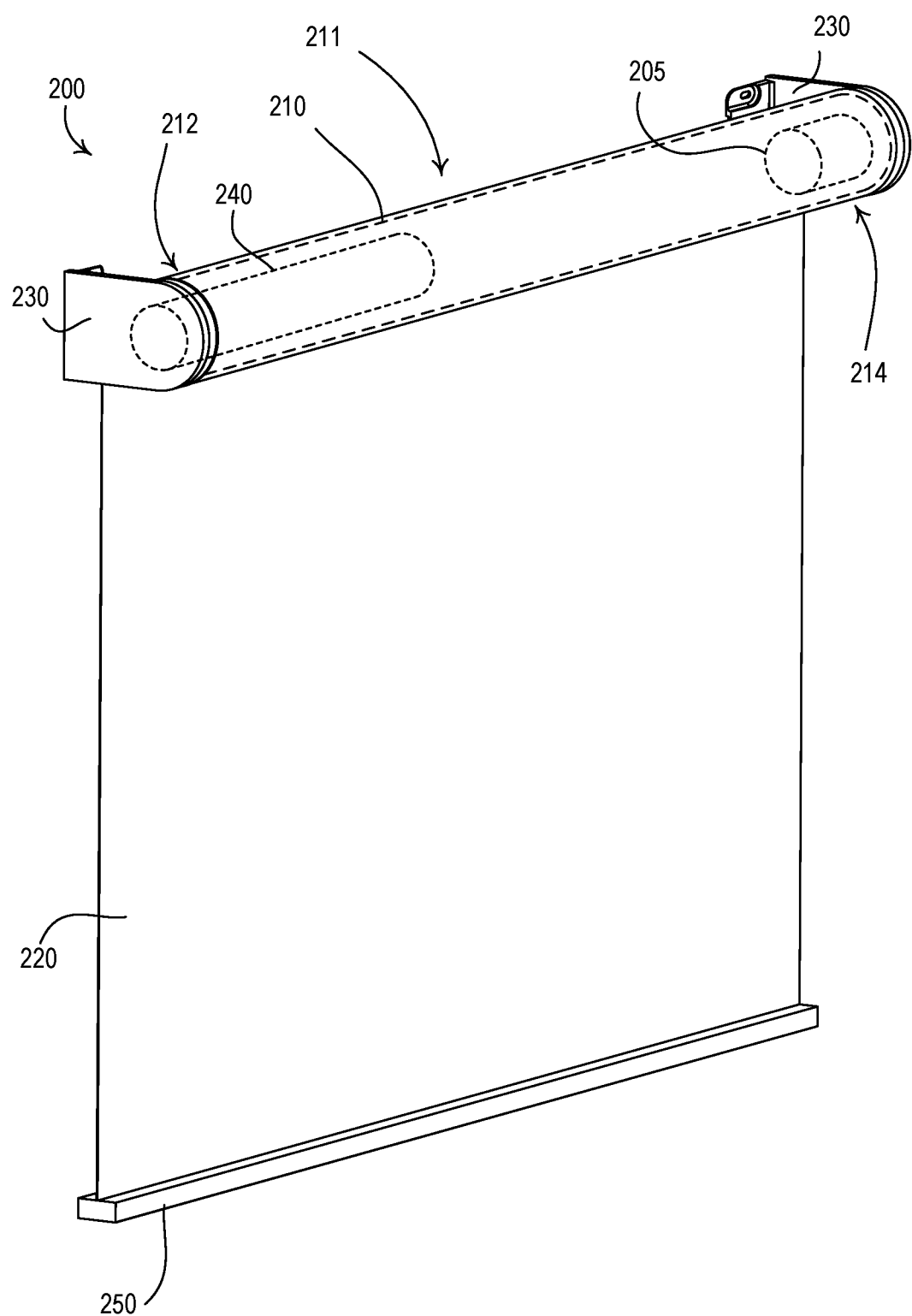
FIG. 2 is a perspective view of an example motorized window treatment.

FIG. 2 is a perspective view of an example motorized window treatment 200 which may be deployed as one or more of the motorized window treatment treatments 150 of the load control system 100. The motorized window treatment 200 may comprise a roller tube 210 and a covering material 220 (e.g., a flexible material) windingly attached to the roller tube 210. The motorized window treatment 200 may be a window treatment assembly that includes a roller tube assembly 211 and one or more mounting brackets 230. The roller tube assembly 211 may include the roller tube 210, the covering material 220, a motor drive unit 240 at a first end 212 of the roller tube assembly 211, and an idler 205 at a second end 214 of the roller tube assembly 211. The mounting brackets 230 may be configured to be coupled to or otherwise mounted to a structure. For example, each of the mounting brackets 230 may be configured to be mounted to (e.g., attached to) a window frame, a wall, or other structure, such that the motorized window treatment 200 is mounted proximate to an opening (e.g., over the opening or in the opening), such as a window for example. The mounting brackets 230 may be configured to be mounted to a vertical structure (e.g., wall-mounted to a wall as shown in FIG. 2) and/or mounted to a horizontal structure (e.g., ceiling-mounted to a ceiling).

The roller tube 210 may operate as a rotational element of the motorized window treatment 200. The roller tube assembly 211 may be rotatably mounted (e.g., rotatably supported) by the mounting brackets 230. The mounting brackets 230 may extend from the structure to which the motorized window treatment 200 is mounted. The covering material 220 may be windingly attached to the roller tube 210, such that rotation of the roller tube 210 causes the covering material 220 to wind around or unwind from the roller tube 210. For example, rotation of the roller tube 210 may cause the covering material 220 to move between a raised position $P_{RAISED}$ (e.g., a fully-raised position and/or a fully-open position) and a lowered position $P_{LOWERED}$ (e.g., a fully-lowered position and/or a fully-closed position). The covering material 220 may include a first end (e.g., a top or upper end) that is coupled to the roller tube 210 and a second end (e.g., a bottom or lower end) that is coupled to a bottom bar 250 (e.g., a hembar). The bottom bar 250 may be configured, for example weighted, to cause the covering material 220 to hang vertically. Rotation of the roller tube 210 may cause the bottom bar 250 to move toward or away from the roller tube 210 between the raised position $P_{RAISED}$ and the lowered position $P_{LOWERED}$.

The covering material 220 may be any suitable material, or form any combination of materials. For example, the covering material 220 may be "scrim," woven cloth, non-woven material, light-control film, screen, and/or mesh. The motorized window treatment 200 may be any type of window treatment. For example, the motorized window treatment 200 may be a roller shade as illustrated, a soft sheer shade, a drapery, a cellular shade, a Roman shade, or a Venetian blind. As shown, the covering material 220 may be a material suitable for use as a shade fabric, and may be alternatively referred to as a flexible material. The covering material 220 is not limited to shade fabric. For example, in accordance with an alternative implementation of the motorized window treatment 200 as a retractable projection screen, the covering material 220 may be a material suitable for displaying images projected onto the covering material.

Figure 3:
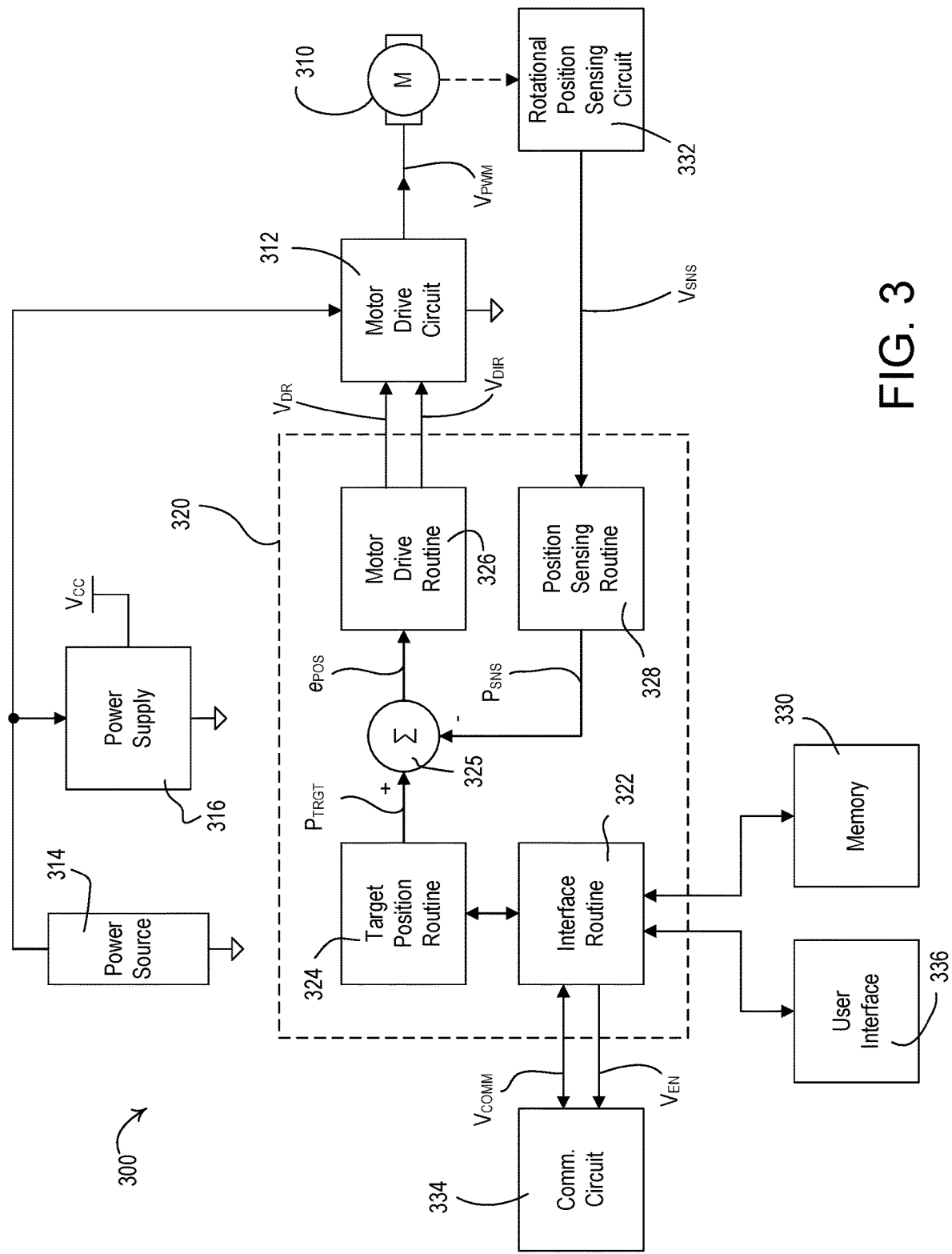
FIG. 3 is a block diagram of a motor drive unit of the motorized window treatment of FIG. 2.

FIG. 3 is a simplified block diagram of a motor drive unit 300 of a motorized window treatment (e.g., the motor drive units 156 of the motorized window treatments 150 shown in FIGS. 1 and/or the motor drive unit 240 of the motorized window treatment 200 shown in FIG. 2). The motor drive unit 300 may include a motor 310 (e.g., a direct-current motor) that may be coupled to a roller tube of the motorized window treatment (e.g., the roller tube 154, 210) for rotating the roller tube. Rotation of the roller tube may be configured to raise and lower a covering material (e.g., the covering material 152, 220). The motor drive unit 300 may include a motor drive circuit 312 (e.g., an H-bridge drive circuit) for controlling the motor 310.

The motor drive unit 300 may comprise a power source 314 that produces a source voltage Vs for powering the motor drive circuit 312. For example, the power source 314 may comprise one or more batteries (e.g., replaceable batteries, such as D-cell batteries, AA batteries, AAA batteries, etc.). The power source 314 may comprise a rechargeable power source, such as rechargeable batteries and/or capacitors (e.g., supercapacitors). Alternatively or additionally, the power source 314 may comprise one or more other power sources, such as a solar cell (e.g., a photovoltaic cell), an ultrasonic energy source, and/or a radio-frequency (RF) energy source. Alternatively and/or additionally, the power source 314 may be powered from an external power source, such as a direct-current (DC) power source or and alternating-current (AC) power source. The motor drive circuit 312 may receive (e.g., directly receive) the source voltage Vs and generate a pulse-width modulated (PWM) voltage $V_{PWM}$ for driving the motor 310. In addition, the motor drive unit 300 may comprise an additional power converter circuit coupled between the power source 314 and the motor drive unit 300, for example, for converting the source voltage Vs to an appropriate magnitude for driving the motor 310. The motor drive unit 300 may also comprise a power supply 316 that may receive the source voltage Vs and generate a low-voltage supply voltage $V_{CC}$ for powering the low-voltage circuitry of the motor drive unit 300.

The motor drive unit 300 may include a control circuit 320 for controlling the operation of the motor 310. The control circuit 320 may include, for example, a microprocessor, a programmable logic device (PLD), a microcontroller, an application specific integrated circuit (ASIC), a field-programmable gate array (FPGA), or any suitable processing device or control circuit. The control circuit 320 may be powered from the supply voltage $V_{CC}$ generated by the power supply 316. The control circuit 320 may be configured to keep track of a present time $t_{PRES}$ (e.g., a relative time) to determine to when to execute procedures and/or perform events. The control circuit 320 may be configured to generate at least one drive signal VDR and a direction signal $V_{DIR}$ for controlling the motor drive circuit 312. The motor drive circuit 312 may be configured to control the rotational speed and the direction of rotation of the motor 310 in response to the drive signal VDR and the direction signal $V_{DIR}$, respectively. For example, the motor drive circuit 312 may comprise an H-bridge drive circuit and/or an H-bridge controller (e.g., an integrated circuit) for controlling the H-bridge drive circuit to generate the PWM voltage $V_{PWM}$ across the motor 310. The control circuit 320 may be configured to control the motor drive circuit 312 to rotate the motor 310 to adjust a present position $P_{PRES}$ of the covering material (e.g., of the bottom bar 250 of the covering material 220) between a raised position $P_{RAISED}$ (e.g., a fully-raised position and/or a fully-open position) and a lowered position $P_{LOWERED}$ (e.g., a fully-lowered position and/or a fully-closed position).

The motor drive unit 300 may comprise a memory 330 (e.g., a non-volatile memory). The memory 330 may be communicatively coupled to the control circuit 320 for the storage and/or retrieval of, for example, operational settings of the motor drive unit 300. In addition, the memory 330 may be configured to store software for execution by the control circuit 320 to operate the motor drive unit 300. The memory 330 may be implemented as an internal circuit of the control circuit 320 or as an external integrated circuit (IC). The memory 330 may comprise a computer-readable storage media or machine-readable storage media that maintains computer-executable instructions for performing one or more of the procedures and/or routines as described herein. For example, the memory 330 may comprise computer-executable instructions or machine-readable instructions that include one or more portions of the procedures and/or routines described herein. The control circuit 320 may access the instructions from memory 330 for being executed to cause the control circuit 320 to operate as described herein, or to operate one or more other devices as described herein. The memory 330 may comprise computer-executable instructions for executing configuration software. The computer-executable instructions may be executed to perform the procedure 600, 700, and/or 800 as described herein. In some examples, the routines described herein, such as the interface routine 322, the target position routine 324, and/or the position sensing routine 328, may be software that is stored within the memory 330, and that may be accessed and executed by the control circuit 320 to cause the control circuit 320 to operate as described herein. Further, the memory 330 may have stored thereon one or more settings and/or control parameters associated with the motor drive unit 300.

The motor drive unit 300 may include a rotational position sensing circuit 332, such as, for example, a Hall effect sensor (HES) circuit, which may be configured to generate one or more sense signals $V_{SNS}$ (e.g., Hall effect sensor signals and/or rotational position signals). The one or more sense signals $V_{SNS}$ may indicate the rotational speed and/or the direction of rotation of the motor 310 to the control circuit 320. For example, the one or more sense signals $V_{SNS}$ may comprise PWM signals, where a frequency of rising and/or falling edges of the PWM signals may indicate the rotational speed of the motor 310 and an offset between the rising and/or falling edges of the different PWM signals may indicate the direction of the motor 310. The rotational position sensing circuit 332 may include other suitable position sensors, such as, for example, magnetic, optical, and/or resistive sensors.

The control circuit 320 may be configured to determine a rotational position and/or the direction of rotation of the motor 310 in response to the sense signals $V_{SNS}$ generated by the rotational position sensing circuit 332. The control circuit 320 may be configured to determine the present position $P_{PRES}$ of the covering material in response to the sense signals $V_{SNS}$ generated by the rotational position sensing circuit 332. For example, the present position $P_{PRES}$ of the covering material may be stored in terms of a number of falling and/or rising edges of the PWM signals generated by a Hall effect sensor circuit. The present position $P_{PRES}$ off the covering material and/or limits for controlling the present position $P_{PRES}$ of the covering material (e.g., the raised position $P_{RAISED}$ and/or the lowered position $P_{LOWERED}$) may be stored in the memory 324. The operation of a motor drive circuit and a Hall effect sensor circuit of an example motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 300 may include a communication circuit 334 that may allow the control circuit 320 to transmit and/or receive wireless signals, e.g., such as radio-frequency (RF) signals. The control circuit 320 may be configured to transmit to the communication circuit 334 communication signals $V_{COMM}$ to be transmitted by the communication circuit 334 and/or receive from the communication circuit 334 communication signals $V_{COMM}$ that are received by the communication circuit 334. The control circuit 320 may also be configured to enable and disable the communication circuit 334. For example, the control circuit 320 may generate an enable control signal VEN for enabling and disabling the communication circuit 334. The communication circuit 334 may be implemented as an internal circuit of the control circuit 320 or as an external integrated circuit (IC).

The motor drive unit 300 may include a user interface 336 having one or more buttons that allow a user to provide inputs to the control circuit 320 during setup and/or configuration of the motorized window treatment. The control circuit 320 may be configured to control the motor 310 to control the movement of the covering material in response to a shade movement command received from the communication signals $V_{COMM}$ received via the communication circuit 334 and/or the user inputs received via the buttons of the user interface 336. The user interface 336 may also include one or more light-emitting diodes (LEDs) that may be illuminated by the control circuit 320, for example, to provide feedback to the user of the motorized window treatment.

The control circuit 320 may execute one or more routines (e.g., software routines and/or procedures) to generate the drive signal VDR in response to the sense signals $V_{SNS}$, as well as to interface with the memory 330, the communication circuit 334, and/or the user interface 336. For example, the control circuit 320 may execute an interface routine 322 for interfacing with the memory 330, the communication circuit 334, and/or the user interface 336. The interface routine 322 may be configured to receive a message via the communication circuit 334 and determine a command included in the received message. For example, the interface routine 322 may be configured to determine a destination position $P_{DEST}$ for an adjustment of the covering material in response to the command. In addition, the interface module 322 may be configured to determine a command for adjusting the covering material (e.g., and determine the destination position $P_{DEST}$) in response to an actuation of one of the one or more buttons of the user interface 336.

The control circuit 320 may execute a target position routine 324 for determining a target position $P_{TRGT}$ to which to adjust the present position $P_{PRES}$ of the covering material (e.g., to adjust the covering material towards the destination position $P_{DEST}$). The control circuit 320 may execute a motor drive routine 326 to generate the drive signal VDR and/or the direction signal $V_{DIR}$ for controlling the rotational speed and/or the direction of rotation of the motor 310. The control circuit 320 may also execute a position sensing routine 328 for determining a sensed position $P_{SNS}$ of the covering material in response to the sense signals $V_{SNS}$. The control circuit 320 may execute a closed-loop control loop to allow the motor drive routine 326 to control the present position $P_{PRES}$ of the covering material towards the target position $P_{TRGT}$ (e.g., as determined by the target position routine 324) in response to the sensed position $P_{SNS}$ (e.g., as determined by the position sensing routine 328). For example, the control circuit 320 may generate a position error epos by subtracting the sensed position $P_{SNS}$ from the target position $P_{TRGT}$. The motor drive routine 326 may control the drive signal VDR (e.g., the duty cycle of the drive signal VDR) and/or the direction signal $V_{DIR}$ in response to the position error epos to control the present position $P_{PRES}$ of the covering material towards the target position $P_{TRGT}$.

The target position routine 324 may also be configured to adjust the target position $P_{TRGT}$ with respect to time to adjust the present position $P_{PRES}$ of the covering material towards the destination position $P_{DEST}$. The target position routine 324 may also be configured to adjust the target position $P_{TRGT}$ to account for the diameter d of the roller tube, the thickness/of the covering material, and a number N of full rotations of the covering material that are presently wound around the roller tube, such that the covering materials of motorized window treatments (e.g., all motorized window treatments) in the load control system are aligned and/or controlled at a same linear speed v (e.g., a predetermined linear speed $v_p$). The target position routine 324 may adjust the target position $P_{TRGT}$ to cause the motor drive routine 326 to generate the drive signal VDR such the rotational speed w of the motor is adjusted to maintain the linear speed v of the covering material at the predetermined linear speed $v_p$. The target position routine 324 may adjust the target position $P_{TRGT}$, such that the rotational speed w of the motor is a function of the diameter d of the roller tube, the thickness/of the covering material, the number N of full rotations of the covering material that are presently wound around the roller tube, and predetermined linear speed $v_p$, e.g., $$\omega = (2 \cdot v)/[d + (2 \cdot t \cdot N)].$$

The target position routine 324 may be configured to update the number N of full rotations of the covering material that are presently wound around the roller tube as the covering material is moved between the fully-raised position $P_{FULLY-RAISED}$ and the fully-lowered position $P_{FULLY-LOWERED}$ (e.g., in response to the present position $P_{PRES}$ of the covering material). The target position routine 324 may be configured to retrieve the diameter d of the roller tube and the thickness/of the covering material from the memory 330 via the interface routine 322. The diameter d of the roller tube and the thickness/of the covering material may be stored in the memory 330 during manufacturing of the motorized window treatment and/or during commissioning of the motorized window treatment (e.g., included in a message received by the interface routine 322 via the communication circuit 334).

Figure 4:
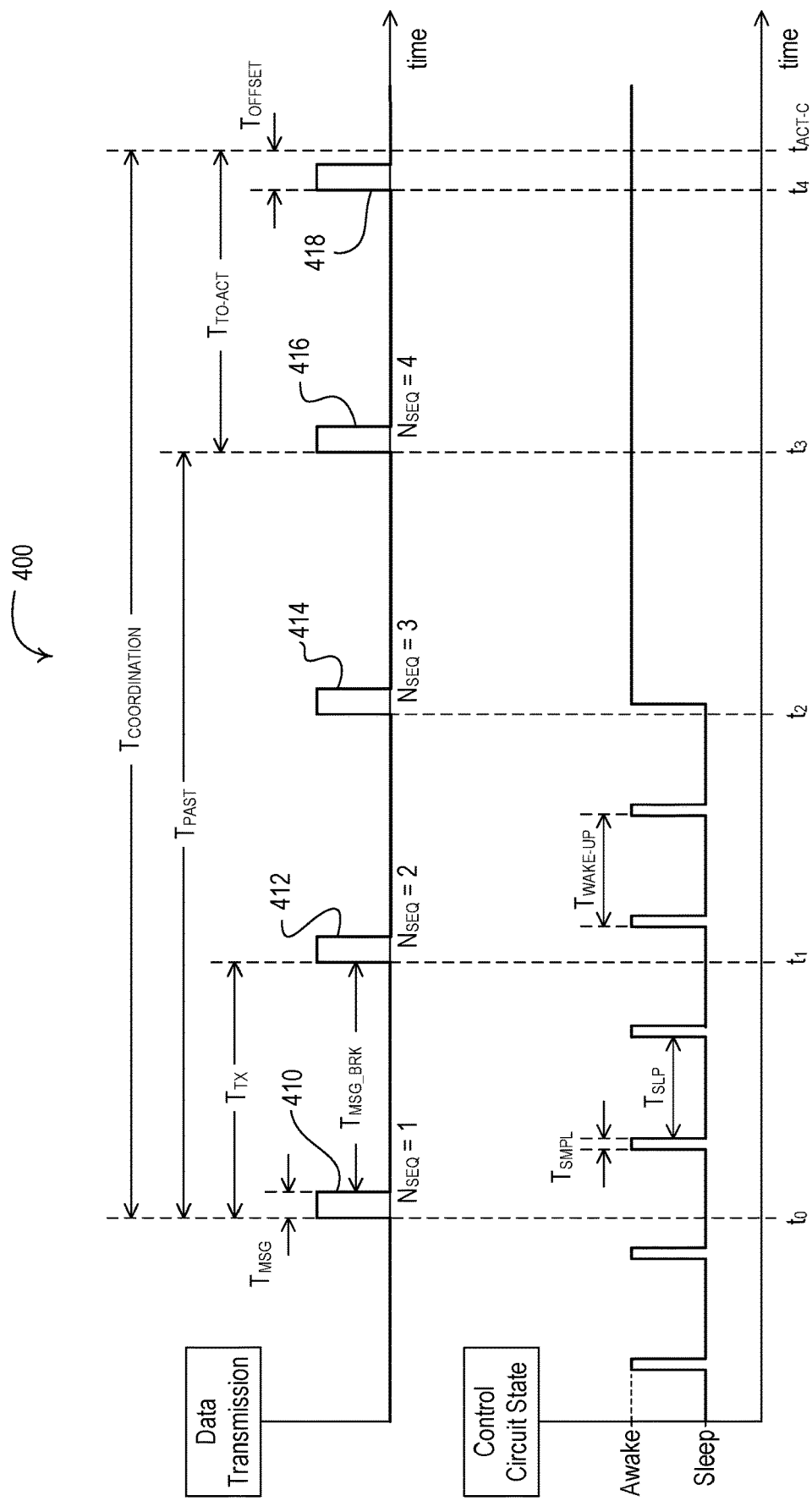
FIG. 4 is a timing diagram illustrating the operation the motor drive unit of FIG. 3 during a transmission event

FIG. 4 is a timing diagram illustrating the operation the control circuit 320 (e.g., the interface routine) and the communication circuit 334 during a transmission event 400. The transmission event 400 may involve the transmission of messages 410-418 (e.g., each including a particular command and/or data) from a transmitting device (e.g., the remote control device 170) to the motor drive unit 300 (e.g., as shown in the upper diagram of FIG. 4). For example, the transmission event may start at time to with the transmission of the first message 410 as shown in FIG. 4. During the transmission event 400, the transmitting device may periodically transmit the messages 410-418 via RF signals (e.g., RF signals 108) at a transmission period $T_{TX}$ (e.g., approximately 12.5 milliseconds). Each of the messages 410-418 transmitted by the transmitting device during the transmission event 400 may include the same command and/or data and may have a length equal to a message-length time period $T_{MSG}$ (e.g., approximately 5 milliseconds). Each of the messages 410-418 may be transmitted multiple times (e.g., up to a maximum number $N_{MAX}$ of times, such as 12 times) during the transmission event 400. For example, each of the messages 410-418 transmitted by the transmitting device during the transmission event 400 may also include a sequence number $N_{SEQ}$, which may start at one for the first message 410 and may be increased by one of each of the subsequent messages of the transmission event 400. Even though five messages 410-418 are shown in FIG. 4, the transmission event 400 may include more than five messages.

While the control circuit 320 is not receiving RF signals (e.g., the messages 410-418) via the communication circuit 334, the control circuit 320 may enter a sleep state (e.g., a sleep mode) to consume less power. Prior to entering the sleep state, the control circuit 320 may disable the communication circuit 334 (e.g., control the communication circuit 334 to a disabled sleep state). The control circuit 320 may periodically wake up from the sleep state (e.g., to enter an awake state) and periodically enable (e.g., wake up) the communication circuit 334 to see if any control devices are presently transmitting one of the messages 410-418 of the transmission event 400 (e.g., as shown on the lower diagram of FIG. 4). For example, the control circuit 320 may wake up from the sleep state and enable the communication circuit 334 for a sampling time period $T_{SMPL}$ (e.g., approximately 300 microseconds) before disabling the communication circuit 334 and entering the sleep state again. The control circuit 320 may enable the communication circuit 334 to start the sampling time period $T_{SMPL}$ periodically according to a wake-up period $T_{WAKE-UP}$ (e.g., every 17.6 milliseconds). For example, the control circuit 320 may go back to sleep for a sleep time period $T_{SLP}$ between consecutive sampling time periods $T_{SMPL}$. The communication circuit 334 may consume (e.g., only consume) significant power during the sampling time periods $T_{SMPL}$.

During each sampling time period $T_{SMPL}$, the control circuit 320 may determine if a message 400 is presently being transmitted. If the control circuit 320 determines that a message 400 is not being transmitted during the RF sample time period $T_{SMPL}$, the control circuit 320 may disable the communication circuit 334 (e.g., cause the communication circuit 334 to enter the sleep state) and enter the sleep state again for (e.g., during the sleep time period $T_{SLP}$). If the control circuit 320 determines that a message 400 is being transmitted during the sample time period $T_{SMPL}$, the control circuit 320 may stay awake and keep the communication circuit 334 enabled, such that the communication circuit 334 is able to receive the next message of the transmission event 400. For example, as shown in FIG. 4, the control circuit 320 and the communication circuit 334 wake up at time $t_2$ during the transmission of the third message 414 of the transmission event 400. The control circuit 320 may stay awake to receive multiple (e.g., all) messages of the transmission event 400 (e.g., the fourth and fifth messages 416, 418 as shown in FIG. 4). After processing of one or more of the received messages of the transmission event 400 is complete and/or execution of the command included in the message is complete, the control circuit 320 may disable the communication circuit 334 (e.g., cause the communication circuit 334 to enter the sleep state) and enter the sleep state again. The control circuit 320 may then begin to periodically wake up according to the wake-up period $T_{WAKE-UP}$ to see if a message is being transmitted during any of the sample time periods $T_{SMPL}$.

The sample time period $T_{SMPL}$, the transmission period $T_{TX}$, and the wake-up period $T_{WAKE-UP}$ may be sized appropriately to ensure that the sample time period $T_{SMPL}$-RF for most of the control devices in the load control system coincides with at least one message of a predetermined number, e.g., a first partial number $N_{PART}$, of the transmitted messages of a transmission event (e.g., as described in greater detail in previously-referenced U.S. Pat. No. 10,041, 292). As a result, the sleep time period $T_{SLP}$ may be much longer than the message time period $T_{MSG}$. In addition, the sample time period $T_{SMPL}$ may be significantly shorter than the message time period $T_{MSG}$. For example, as shown in FIG. 4, the first two messages 410, 412 do not coincide with the sample time period $T_{SMPL}$ when the control circuit 320 is awake. At least a portion of the third message 414 falls within the next sample time period $T_{SMPL}$, such that the control circuit 320 may be able to detect the third message 414 and keep the communication circuit 334 enabled to receive the fourth message 416.

The motorized window treatments of the load control system may be configured to coordinate when the motorized window treatments begin moving the respective covering materials to synchronize the movement and/or position of the covering materials. The motorized window treatments may be configured to start moving the respective covering materials at a coordinated action time $t_{ACT-C}$ that may occur after the first partial number $N_{PART}$ of the multiple messages of the transmission event have been transmitted. For example, the coordinated action time $t_{ACT-C}$ may occur after a coordination time period $T_{COORDINATION}$ from the beginning of the transmission event 400 at time to as shown in FIG. 4. The coordination time period $T_{COORDINATION}$ may be a constant that is defined for the operation of all motorized window treatments in the system. The coordination time period $T_{COORDINATION}$ may be sized such that the coordinated action time $t_{ACT-C}$ occurs after a predetermined message of the transmission event 400 and before a subsequent message is transmitted. For example, the predetermined message may be the fifth message 518 of the transmission event 500 and may have a sequence number $N_{ACT}$ (e.g., a sequence number $N_{ACT}$ of a predetermined action message) equal to five, such that the coordinated action time $t_{ACT-C}$ may occur shortly after the end of the fifth message 518 as shown in FIG. 4.

When a first one of the messages 410-418 of the transmission event 400 is received by the motor drive unit 300, the control circuit 320 may be configured to determine the coordinated action time $t_{ACT-C}$ for any commands included in the received message. The control circuit 320 may be configured to determine the time during the transmission event 400 at which the first full message is received based on the sequence number $N_{SEQ}$ of the received message. For example, as shown in FIG. 4, the control circuit 320 may receive the fourth message 416, which may have a sequence number $N_{SEQ}$ of four. The control circuit 320 may be configured to determine a past time period $T_{PAST}$ that extends from the beginning of the transmission event 400 at time $t_0$ until the fourth message 416 is received at time $t_3$ using the sequence number $N_{SEQ}$ of the received message and the transmission period $T_{TX}$, e.g., $T_{PAST} = N_{SEQ} \cdot T_{TX}$.

The control circuit 320 may also be configured to determine a time period $T_{TO-ACT}$ from the present time $t_{PRES}$ (e.g., the time at which the fourth message 416 is received at time $t_3$) until the coordinated action time $t_{ACT-C}$, e.g., $T_{TO-ACT} = T_{COORDINATION} - T_{PAST}$.

The control circuit 320 may further be configured to determine the coordinated action time $t_{ACT-C}$ based on the present time $t_{PRES}$, the coordination time period $T_{COORDINATION}$, the sequence number $N_{SEQ}$ of the received message, and the transmission period $T_{TX}$, e.g., $t_{ACT-C} = t_{PRES} + (T_{COORDINATION} - N_{SEQ} \cdot T_{TX})$.

For example, the coordinated action time $t_{ACT-C}$ may be an offset time period $T_{OFFSET}$ after the beginning of the last message of the first partial number $N_{PART}$ of the multiple messages of the transmission event. The control circuit 320 may then be configured to determine when the present time $t_{PRES}$ is equal to the coordinated action time $t_{ACT-C}$ and being adjusting the covering material at that time.

Figure 5:
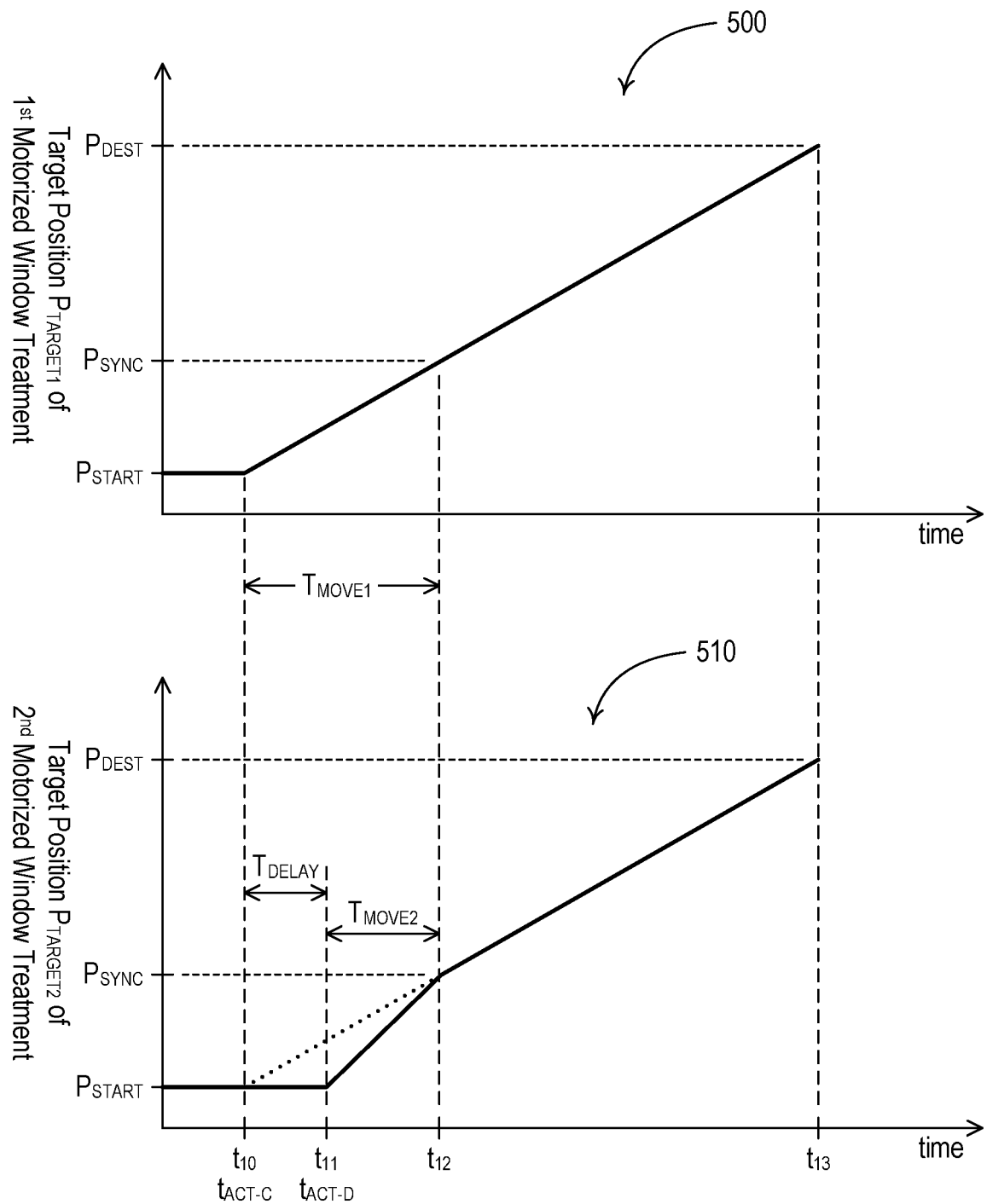
FIG. 5 is a diagram of plots showing respective present positions of two adjacent motorized window treatments.

FIG. 5 is a diagram of plots 500, 510 showing respective target positions $P_{TRGT1}$, $P_{TRGT2}$ of two adjacent motorized window treatments (e.g., such as the motorized window treatments 150 are adjacent to each other as shown in FIG. 1) of a load the control system (e.g., the load control system 100) with respect to time. Each of the adjacent motorized window treatments (e.g., such as the motorized window treatments 150 shown in FIG. 1 and/or the motorized window treatment 200 shown in FIG. 2) may be configured to adjust the target position $P_{TRGT1}$, $P_{TRGT2}$ (e.g., to adjust the present position $P_{PRES1}$, $P_{PRES2}$) in response to a command included in a message received via wireless signals (e.g., the RF signals 108). The message (e.g., one of the messages 410-418 shown in FIG. 4) may be transmitted by another control device of the load control system multiple times (e.g., up to a maximum number $N_{MAX}$ times) during a transmission event. For example, the messages of the transmission event may be transmitted periodically at a transmission period $T_{TX}$ during the transmission event, such that one or more of the messages are received by both of the adjacent motorized window treatments. Each message of a transmission event may include a sequence number $N_{SEQ}$ that may be incremented for each of the sequential messages. For example, the command included in the messages of the transmission event may be a command to adjust the target position $P_{TRGT}$ (e.g., to thus adjust the present position $P_{PRES}$) of the covering material to a destination position $P_{DEST}$.

As previously mentioned, each of the motorized window treatments may be configured to periodically wake up from a sleep state (e.g., at a wake-up period $T_{WAKE-UP}$) to determine if one of the multiple messages of the transmission event is being transmitted. The sample time period $T_{SMPL}$, the transmission period $T_{TX}$ and the wake-up period $T_{WAKE-UP}$ may be sized such that each of the control devices of the load control system (e.g., the motorized window treatments)

may not receive each of the multiple messages of the transmission event, but such that most of the control devices of the load control system may have received at least one of the messages when a first partial number $N_{PART}$ of the multiple messages of the transmission event have been transmitted. Each of the motorized window treatments may wait until the first partial number $N_{PART}$ of the multiple messages of the transmission event have been transmitted before responding to the command (e.g., beginning to adjust the respective target position $P_{TRGT1}$, $P_{TRGT2}$ of the covering material towards the destination position $P_{DEST}$ at a nominal rate INOM). For example, the motorized window treatments may begin adjusting the target positions $P_{TRGT1}$, $P_{TRGT2}$ of the respective covering materials at a time (e.g., a coordinated starting time) that is based on the time at which the first partial number $N_{PART}$ of the multiple messages of the transmission event have been transmitted. For example, the coordinated starting time may be a time after (e.g., immediately following) when the first partial number $N_{PART}$ of the multiple messages of the transmission event have been transmitted.

However, in some cases, a motorized window treatment may not receive any of the messages in the first partial number $N_{PART}$ of messages at the beginning of the transmission event. In such a case, the motorized window treatment may receive one of the messages after the first partial number $N_{PART}$ of the multiple messages of the transmission event have been transmitted (e.g., after the message of the transmission event that has the sequence number $N_{SEQ}$ equal to the first partial number $N_{PART}$) and thus may begin to move the respective covering material after the other motorized window treatments of the load control system begin to move their respective covering materials (e.g., and be "out of sync" with the other motorized window treatments). The motorized window treatment may respond to the command (e.g., begin to adjust one of the respective target positions $P_{TRGT1}$, $P_{TRGT2}$ of the covering material) at a time after (e.g., immediately after the end of) the first received message of the transmission event (e.g., the first received message after the first partial number $N_{PART}$ of the multiple messages of the transmission event). Since the messages of the transmission event are transmitted periodically at the transmission period $T_{TX}$, the motorized window treatment may determine a delay period $T_{DELAY}$ from when the motorized window treatment should have begun to adjust the covering material to when the motorized window treatment actually began to adjust the covering material.

When the motorized window treatment begins to adjust the covering material after the delay period $T_{DELAY}$, the motorized window treatment may adjust the respective target position $P_{TRGT1}$, $P_{TRGT2}$ of the covering material at an increased rate $r_{INC}$ (e.g., that is greater than the nominal rate $r_{NOM}$). The motorized window treatment may operate at the increased rate $r_{INC}$ until the motorized window treatment is synchronized with the other motorized window treatments (e.g., those motorized window treatments that did not begin adjustment of the covering material with a delay) based on the value of the delay period $T_{DELAY}$ (e.g., as will be described in greater detail below). After the motorized window treatment is synchronized with the other motorized window treatments, the motorized window treatment may adjust the respective target position $P_{TRGT1}$, $P_{TRGT2}$ of the covering material to the destination position $P_{DEST}$ at the nominal rate INOM. The time at which the motorized window treatment may begin to adjust the respective target position $P_{TRGT1}$, $P_{TRGT2}$ of the covering material at the nominal rate INOM may be based on the determined delay time $T_{DELAY}$.

As shown in FIG. 5, the covering materials of the first and second motorized window treatments may each initially be at a starting position $P_{START}$ (e.g., may both be at the same position). The first motorized window treatment may receive one of the messages in the first partial number $N_{PART}$ of messages at the beginning of the transmission event (e.g., one of the first $N_{PART}$ messages). At time $t_{10}$, the first motorized window treatment may begin to move the covering material after the partial number $N_{PART}$ of messages of the transmission event have been received (e.g., immediately following the end of the message of the transmission event that has the sequence number $N_{SEQ}$ equal to the first partial number $N_{PART}$). The first motorized window treatment may control the motor to adjust the target position $P_{TRGT1}$ at the nominal rate $r_{NOM}$ from time $t_{10}$ until the first motorized window treatment reaches the destination position $P_{DEST}$ at time $t_{13}$.

The second motorized window treatment may receive a message after the first partial number $N_{PART}$ of messages at the beginning of the transmission event. At time $t_1$, the second motorized window treatment may begin to move the covering material after (e.g., immediately following the end of) the first received message of the transmission event (e.g., the first received message after the first partial number $N_{PART}$ of the multiple messages of the transmission event). While the second motorized window treatment is unsynchronized with the first motorized window treatment, the second motorized window treatment may control the motor to adjust the target position $P_{TRGT2}$ at the increased rate $r_{INC}$. The second motorized window treatment may determine (e.g., calculate) the delay period $T_{DELAY}$ from time to (e.g., when the first motorized window treatment began to adjust the target position $P_{TRGT1}$ of the covering material) to time $t_{11}$ (e.g., when the second motorized window treatment will begin to adjust the target position $P_{TRGT2}$ of the covering material). The second motorized window treatment may operate at the increased rate $r_{INC}$ until the second motorized window treatment is synchronized with the first motorized window treatment at time $t_{12}$ (e.g., at a synchronization position $P_{SYNC}$) based on the value of the delay period $T_{DELAY}$ determined for the second motorized window treatment. After the second motorized window treatment is synchronized with the first motorized window treatment at $t_{12}$, the second motorized window treatment may adjust the target position $P_{TRGT2}$ at the nominal rate INOM from time $t_{12}$ until the second motorized window treatment reaches the destination position $P_{DEST}$ at time $t_{13}$. As a result, the first motorized window treatment may control the target position $P_{TRGT1}$ of the covering material to the synchronization position $P_{SYNC}$ over a first movement period $T_{MOVE1}$ from time $t_{10}$ to time $t_{12}$, and the second motorized window treatment may control the target position $P_{TRGT2}$ of the covering material to the synchronization position $P_{SYNC}$ over a second movement period $T_{MOVE2}$ from time $t_{11}$ to time $t_{12}$.

Figure 6:
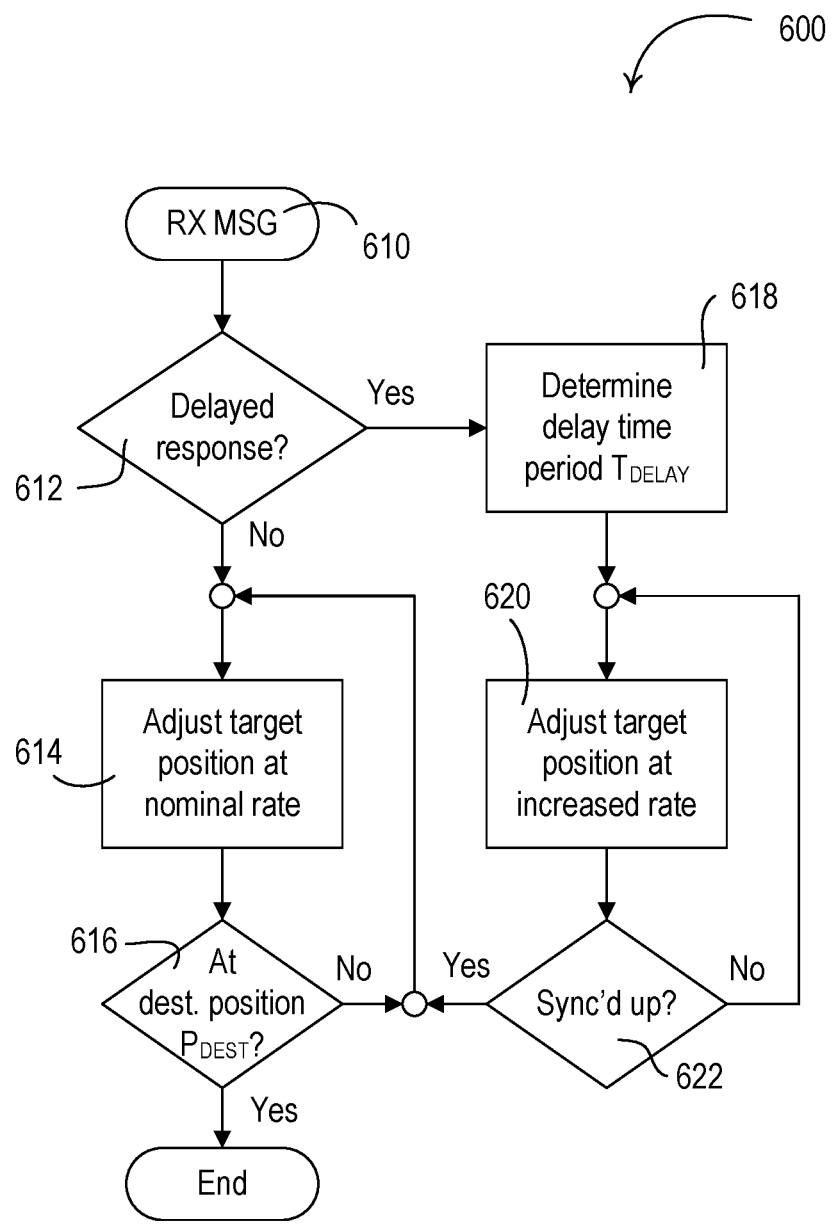
FIG. 6 is a flowchart of an example control procedure for adjusting a target position for a covering material of a motorized window treatment.

FIG. 6 is a flowchart of an example control procedure 600 for adjusting a target position $P_{TRGT}$ for a covering material of a motorized window treatment (e.g., the motorized window treatments 150 shown in FIG. 1 and/or the motorized window treatment 200 shown in FIG. 2). For example, the control procedure 600 may be executed by a control circuit of a motor drive unit (e.g., the control circuit 320 of the motor drive unit 300 shown in FIG. 3) of the motorized window treatment. The control procedure 600 may be executed as part of a target position routine (e.g., the target position routine 324) of the control circuit. The control circuit may execute the control procedure 600 at 610 in response to receiving a message via wireless signals (e.g., the RF signals 108, 109). The message may include a command to which the control circuit may be responsive. For example, the message may include a command for adjusting a target position $P_{TRGT}$ (e.g., to adjust a present position $P_{PRES}$) of the covering material to a destination position $P_{DEST}$. The control circuit may be configured to keep track of a present time $t_{PRES}$ to determine when to execute procedures and/or perform events.

The message (e.g., one of the messages 410-418 shown in FIG. 4) may be transmitted by another control device of the load control system multiple times (e.g., up to a maximum number $N_{MAX}$ times) during a transmission event. For example, the messages may be transmitted periodically at a transmission period $T_{TX}$ during the transmission event, such that one or more of the messages are received by both of the adjacent motorized window treatments. Each message of the transmission event may include a sequence number $N_{SEQ}$ that may be incremented for each of the sequential messages. The control circuit may be configured to periodically wake up from a sleep state (e.g., at a wake-up period $T_{WAKE-UP}$) to determine if one of the multiple messages of the transmission event is being transmitted. The transmission period $T_{TX}$ and the wake-up period $T_{WAKE-UP}$ may be sized such that each of the control devices of the load control system (e.g., the motorized window treatments) may not receive each of the multiple messages of the transmission event, but such that most of the control devices of the load control system may have received at least one of the messages when a first partial number $N_{PART}$ of the multiple messages of the transmission event have been transmitted. Each of the motorized window treatments may wait until the first partial number $N_{PART}$ of the multiple messages of the transmission event have been transmitted before responding to the command (e.g., before beginning to adjust the respective target position $P_{TRGT1}$, $P_{TRGT2}$ of the covering material at a nominal rate INOM). For example, the nominal rate INOM may be a predetermine constant value for controlling the movement of the covering material. In addition, the nominal rate INOM may be variable. For example, the control circuit may receive a value for the nominal rate INOM in a message received via the communication circuit and/or as part of the command included in the received message of the transmission event.

At 612, the control circuit may determine if the response to the command included in the message is delayed. For example, the control circuit may determine if adjustment of the covering material is delayed as compared to other motorized window treatments in the load control system. The control circuit may determine if there may be a delay between the time at which the other motorized window treatments began moving and the time at which the control circuit may begin adjusting the present position of the covering material. The control circuit may determine if the message including the command was received after a time at which the other motorized window treatments began to move their respective covering materials. For example, the control circuit may determine that there is a delayed response if the sequence number $N_{SEQ}$ of the first received message of the transmission event is greater than a sequence number $N_{ACT}$ of a predetermined message (e.g., a predetermined action message) of the transmission event after which (e.g., immediately after which) the other motorized window treatments may begin to adjust their respective covering materials. The predetermined action message of the transmission event may be the last message that is part of the first partial number $N_{PART}$ of message of the transmission event. For example, the sequence number $N_{ACT}$ of the predetermined message may be equal to the first partial number $N_{PART}$.

If the control circuit determines that there is not a delayed response at 612, the control circuit may be configured to adjust the target position $P_{TRGT}$ at a nominal rate INOM at 614 (e.g., as shown between time $t_{10}$ and $t_{12}$ in the plot 500 of FIG. 5). For example, the control circuit may periodically adjust the target position $P_{TRGT}$ by an adjustment amount $\Delta P$ (e.g., a predetermined adjustment amount) at 614. For example, the adjustment amount $\Delta P$ may be a positive amount when the covering material is being raised and a negative amount when the covering material is being lowered. The control circuit may adjust the target position $P_{TRGT}$ at the nominal rate INOM by adjusting the target position $P_{TRGT}$ by the adjustment amount $\Delta P$ at a nominal period $T_{NOM}$ (e.g., $r_{NOM}=\Delta P/T_{NOM}$). Each time that the control circuit adjusts the target position $P_{TRGT}$, the control circuit may adjust the target position $P_{TRGT}$ by the adjustment amount $\Delta P$ (e.g., by only the adjustment amount $\Delta P$). The control circuit may continue to adjust the target position $P_{TRGT}$ at the nominal rate INOM at 614 until the target position $P_{TRGT}$ reaches the destination position $P_{DEST}$ at 616. When the target position $P_{TRGT}$ is greater than or equal to the destination position $P_{DEST}$ at 616, the control procedure 600 may end.

If the control circuit determines that there is a delayed response at 612, the control circuit may be configured to determine, at 618, a delay period $T_{DELAY}$ that may exist between the time at which the other motorized window treatments began moving and the time at which the control circuit may begin adjusting the target position $P_{TRGT}$ of the covering material (e.g., the delay period $T_{DELAY}$ shown in FIG. 5). For example, the control circuit may calculate the delay period $T_{DELAY}$ by multiplying a difference between the sequence number $N_{SEQ}$ of the first received message of the transmission event and the sequence number $N_{ACT}$ of a predetermined action message of the transmission event by the transmission period $T_{TX}$, e.g., $$T_{DELAY}=(N_{SEQ}-N_{ACT}) \cdot T_{TX}.$$

The control circuit may be configured to adjust the target position $P_{TRGT}$ at an increased rate $r_{INC}$ at 620 (e.g., as shown between time $t_1$ and $t_{12}$ in the plot 510 of FIG. 5). For example, the control circuit may be configured to periodically adjust the target position $P_{TRGT}$ by the predetermined increment $\Delta P$ at 620. The control circuit may be configured to adjust the target position $P_{TRGT}$ at the increased rate $r_{INC}$ by adjusting the target position $P_{TRGT}$ by the adjustment amount $\Delta P$ at a decreased period $T_{DEC}$ (e.g., $r_{INC}=\Delta P/T_{DEC}$).

At 622, the control circuit may be configured to determine when the covering material is synchronized with other motorized window treatments that started adjusting the covering material after (e.g., immediately after) the predetermined action message (e.g., the message of the transmission event having the sequence number $N_{ACT}$). For example, when the control circuit determines the delay period $T_{DELAY}$ at 618, the control circuit may also set a time $t_{LAST}$ at which the target position $P_{TRGT}$ was last adjusted equal to the present time $t_{PRES}$ minus the determined delay period $T_{DELAY}$ (e.g., to load a relatively large error into the time $t_{LAST}$ at which the target position $P_{TRGT}$ was last adjusted). As the control circuit adjusts the target position $P_{TRGT}$ at the increased rate $r_{INC}$, the control circuit may move the time $t_{LAST}$ at which the target position $P_{TRGT}$ was last adjusted towards the present time $t_{PRES}$ (e.g., increase the time $t_{LAST}$ at which the target position $P_{TRGT}$ was last adjusted) each operating cycle as the control circuit adjusts the target position $P_{TRGT}$ by the adjustment amount $\Delta P$ at 620, and may determine that the covering material is synchronized with the covering materials of the other motorized window treatments when the time $t_{LAST}$ at which the target position $P_{TRGT}$ was last adjusted reaches approximately the present time $t_{PRES}$ (e.g., by determining that the present time $t_{PRES}$ is less than the time $t_{LAST}$ at which the control circuit last adjusted the target position plus an adjustment period $T_{ADJ}$ as will be described in greater detail below with reference to FIG. 8).

Additionally and/or alternatively, the control circuit may determine when the covering material is synchronized with the other motorized window treatments at 622 by monitoring a synchronization period $T_{SYNC}$ from the time at which the control circuit may begin adjusting the present position $P_{PRES}$ of the covering material (e.g., from a starting position $P_{START}$) to the time at which the covering material may be synchronized with the covering materials of the other motorized window treatments. When the control circuit determines the delay period $T_{DELAY}$ at 618, the control circuit may also determine (e.g., calculate) the length of the synchronization period $T_{SYNC}$ using the determined delay period $T_{DELAY}$. For example, the synchronization period $T_{SYNC}$ may extend between time $t_{11}$ and the time $t_{12}$ of the plot 510 shown in FIG. 5 as the control circuit is adjusting the covering material at the increased rate $r_{INC}$ (e.g., the synchronization period $T_{SYNC}$ may be equal to the second movement period $T_{MOVE2}$). The control circuit may be configured to calculate the length of the synchronization period $T_{SYNC}$ based on the nominal rate INOM, the increased rate $r_{INC}$, and the delay period $t_{DELAY}$, e.g., $$T_{SYNC}=(r_{NOM} \cdot T_{DELAY})/(r_{INC}-r_{NOM}).$$

When the control circuit first starts adjusting present position $P_{PRES}$ of the covering material at the increase rate $r_{INC}$ (e.g., at time $t_{11}$ of the plot 510 in FIG. 5), the control circuit may start a timer. The control circuit may use the timer to keep track of a time period since the control circuit began to adjust the present position $P_{PRES}$ of the covering material. The control circuit may determine that the covering material is synchronized with the other motorized window treatments at 622 when the value of the timer equals the value of the synchronization period $T_{SYNC}$.

Additionally and/or alternatively, the control circuit may determine when the covering material is synchronized with the other motorized window treatments at 622 by determining the synchronization position $P_{SYNC}$ at which the covering material may be synchronized with the covering materials of the other motorized window treatments. When the control circuit determines the delay period $T_{DELAY}$ at 618, the control circuit may also determine (e.g., calculate) the synchronization position $P_{SYNC}$ using the determined delay period $T_{DELAY}$. For example, the synchronization position $P_{SYNC}$ may be the synchronization position $P_{SYNC}$ shown on the plot 510 in FIG. 5. The control circuit may be configured to calculate the length of the synchronization position $P_{SYNC}$ based on the nominal rate INOM, the increased rate $r_{INC}$, and the delay period $t_{DELAY}$, e.g., $$P_{SYNC}=P_{START}+[r_{INC} \cdot (r_{NOM} \cdot T_{DELAY})/(r_{INC}-r_{NOM})].$$

The control circuit may determine that the covering material is synchronized with the other motorized window treatments by determining when the present position $P_{PRES}$ is equal to the synchronization position $P_{SYNC}$ at 622.

The control circuit may continue to adjust the target position $P_{TRGT}$ at the increased rate $r_{INC}$ at 620 until the control circuit determines that the covering material is synchronized with the other motorized window treatments at 622. When the covering material is synchronized with the other motorized window treatments at 622, the control circuit may adjust the target position $P_{TRGT}$ at the nominal rate INOM at 614 until the target position $P_{TRGT}$ reaches the destination position $P_{DEST}$ at 616 at which time, the control procedure 600 may end.

Figure 7:
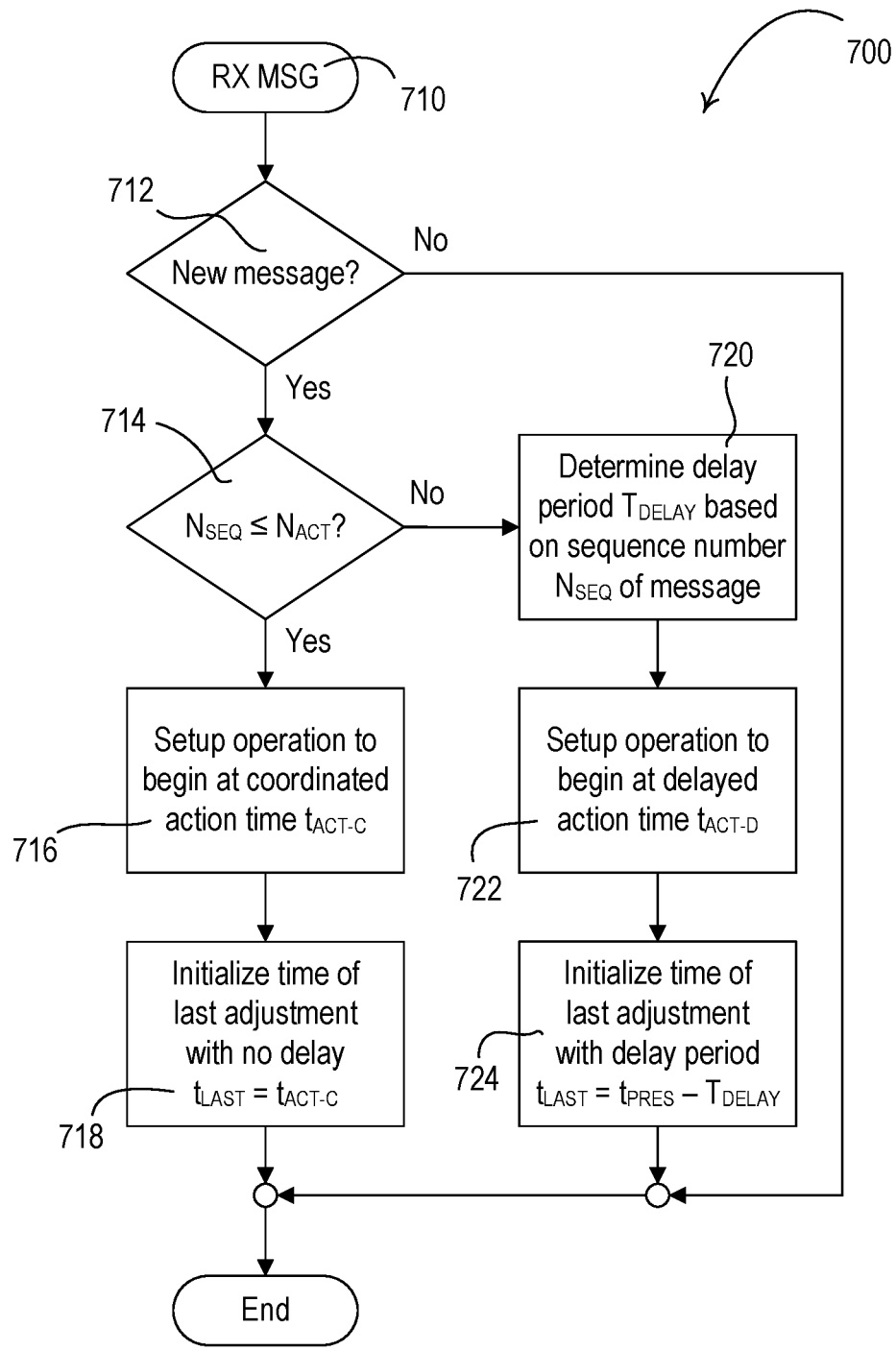
FIG. 7 is a flowchart of an example control procedure for receiving a message including a command for controlling an electrical load.

FIG. 7 is a flowchart of an example control procedure 700 for receiving a message including a command for controlling an electrical load. In some examples, the control procedure 700 may be executed to receive a message including a command for adjusting a covering material of a motorized window treatment (e.g., the motorized window treatments 150 shown in FIG. 1 and/or the motorized window treatment 200 shown in FIG. 2). For example, the control procedure 700 may be executed by a control circuit of a motor drive unit (e.g., the control circuit 320 of the motor drive unit 300 shown in FIG. 3) of the motorized window treatment. The control procedure 700 may be executed as part of an interface routine (e.g., the interface routine 322) and/or a target position routine (e.g., the target position routine 324) of the control circuit. The control circuit may be configured to keep track of a present time $t_{PRES}$ (e.g., a relative time) to determine to when to execute procedures and/or perform events.

The control circuit may execute the control procedure 700 at 710 in response to receiving a message via wireless signals (e.g., the RF signals 108). The message may include a command to which the control circuit may be responsive. For example, the message may include a command for adjusting a target position $P_{TRGT}$ (e.g., to adjust a present position $P_{PRES}$) of the covering material to a destination position $P_{DEST}$. The message may be transmitted by another control device of the load control system multiple times (e.g., up to a maximum number $N_{MAX}$ times, such as 12 times) during a transmission event (e.g., as shown in FIG. 4). For example, the message may be transmitted periodically at a transmission period $T_{TX}$ during the transmission event, such that one or more of the messages are received by both of the adjacent motorized window treatments. Each message of the transmission event may include a sequence number $N_{SEQ}$ that may be incremented for each of the sequential messages. The control circuit may be configured to periodically wake up from a sleep state (e.g., at a wake-up period $T_{WAKE-UP}$) to determine if one of the multiple messages of the transmission event is being transmitted. The transmission period $T_{TX}$ and the wake-up period $T_{WAKE-UP}$ may be sized such that each of the control devices of the load control system may not receive each of the multiple messages of the transmission event, but such that most of the control devices of the load control system may have received at least one of the messages when a first partial number $N_{PART}$ of the multiple messages of the transmission event have been transmitted.

At 712, the control circuit may determine if the message that was received at 710 is a new message. For example, the control circuit may determine that the new message is a new message if the message is the first received message of a transmission event. If the message is not a new message at 712 (e.g., the control circuit previously received a message during the transmission event), the procedure 700 may exit. If the message is a new message at 712, the control circuit may determine at 714 whether the message that was received at 710 is one of the first partial number $N_{PART}$ of the multiple messages of the transmission event (e.g., to determine if adjustment of the covering material may be delayed or not delayed as compared to other motorized window treatments). For example, the control circuit may determine at 714 if the sequence number $N_{SEQ}$ of the received message is greater than or equal to a sequence number $N_{ACT}$ of a predetermined action message of the transmission event (e.g., such as the last message that is part of the first partial number $N_{PART}$) after which the other motorized window treatments may begin to adjust their respective covering materials. For example, the sequence number $N_{ACT}$ of the predetermined action message may be equal to the first partial number $N_{PART}$.

When the sequence number $N_{SEQ}$ is less than or equal to the sequence number $N_{ACT}$ at 714 (e.g., adjustment of the covering material may not be delayed as compared to the other motorized window treatments), the control circuit may at 716 may setup operation (e.g., adjustment of the covering material) to begin at a coordinated action time $t_{ACT-C}$ after the present time $t_{PRES}$ (e.g., the coordinated action time $t_{ACT-C}$ shown in FIG. 4). The coordinated action time $t_{ACT-C}$ may be a time at which the motorized window treatments (e.g., those motorized window treatments that receive a message having a sequence number $N_{SEQ}$ less than or equal to the sequence number $N_{ACT}$) may begin adjusting the respective covering materials (e.g., in a coordinated manner). For example, the coordinated action time $t_{ACT-C}$ may be after (e.g., immediately after) the partial number $N_{PART}$ of the multiple messages of the transmission event have been transmitted (e.g., a short delay period after finishing processing the predetermined action message having a sequence number $N_{SEQ}$ equal to the sequence number $N_{ACT}$). The control circuit may be configured to determine the coordinated action time $t_{ACT-C}$ based on the present time $t_{PRES}$, a coordination time period $T_{COORDINATION}$, the sequence number $N_{SEQ}$ of the received message, and the transmission period $T_{TX}$, e.g., $$t_{ACT-C} = t_{PRES} + (T_{COORDINATION} - N_{SEQ} \cdot T_{TX}).$$

Additionally and/or alternatively, the control circuit may be configured to determine the coordinated action time $t_{ACT-C}$ based on the present time $t_{PRES}$, the sequence number $N_{SEQ}$ of the received message, the sequence number $N_{ACT}$ of the predetermined message, and the transmission period $T_{TX}$, e.g., $$t_{ACT-C} = t_{PRES} + [(N_{ACT} - N_{SEQ}) \cdot T_{TX}] + T_{OFFSET},$$

where $T_{OFFSET}$ may be an offset time period that may be equal to the message time period $T_{MSG}$ plus a short delay period. At 716, the control circuit may also determine to cease periodically going to sleep and stay awake until the transmission event and/or the adjustment of the covering material is complete. At the coordinated action time $t_{ACT-C}$, the control circuit may begin adjustment of the covering material, e.g., at the nominal rate INOM. While the control circuit is adjusting the present position $P_{PRES}$ of the covering material, the control circuit may keep track of a time $t_{LAST}$ at which a target position $P_{TRGT}$ for the covering material was last adjusted. At 718, the control circuit may initialize the time $t_{LAST}$ at which the target position $P_{TRGT}$ was last adjusted to be equal to the coordinated action time $t_{ACT-C}$, and the control procedure 700 may exit.

When the sequence number $N_{SEQ}$ is greater than the sequence number $N_{ACT}$ at 714, adjustment of the covering material may be delayed (e.g., as compared to other motorized window treatments). At 720, the control circuit may determine a delay period $T_{DELAY}$ that may exist between the time at which the other motorized window treatments began moving and the time at which the control circuit will begin adjusting the present position $P_{PRES}$ of the covering material. The control circuit may determine the delay period $T_{DELAY}$ based on the sequence number $N_{SEQ}$ of the received message. For example, the control circuit may calculate the delay period $T_{DELAY}$ based on the sequence number $N_{SEQ}$ of the received message, the sequence number $N_{ACT}$ of the predetermined action message, and the transmission period $T_{TX}$, e.g., $$T_{DELAY} = (N_{SEQ} - N_{ACT}) \cdot T_{TX}.$$

At 722, the control circuit may setup operation (e.g., adjustment of the covering) to begin at a delayed action time $t_{ACT-D}$ shortly after the present time $t_{PRES}$. The delayed action time $t_{ACT-D}$ may occur after the coordinated action time $T_{ACT-C}$ at which motorized window treatments (e.g., those motorized window treatments that receive a message having a sequence number $N_{SEQ}$ less than or equal to the sequence number $N_{ACT}$) began adjusting the respective covering materials. For example, the delayed action time $t_{ACT-D}$ may be after (e.g., immediately after) the received message (e.g., a short delay period after finishing processing the received message). At 722, the control circuit may also determine to cease periodically going to sleep and stay awake until the transmission event and/or the adjustment of the covering material is complete. At the delayed action time $t_{ACT-D}$, the control circuit may begin adjustment of the covering material, e.g., at the increased rate $r_{INC}$. At 724, the control circuit may initialize the time $t_{LAST}$ at which the target position $P_{TRGT}$ was last adjusted to be equal to the present time $t_{PRES}$ minus the determined delay period $T_{DELAY}$ (e.g., to load a relatively large error into the value of the time $t_{LAST}$ at which the target position $P_{TRGT}$ was last adjusted), and the control procedure 700 may end.

Figure 8:
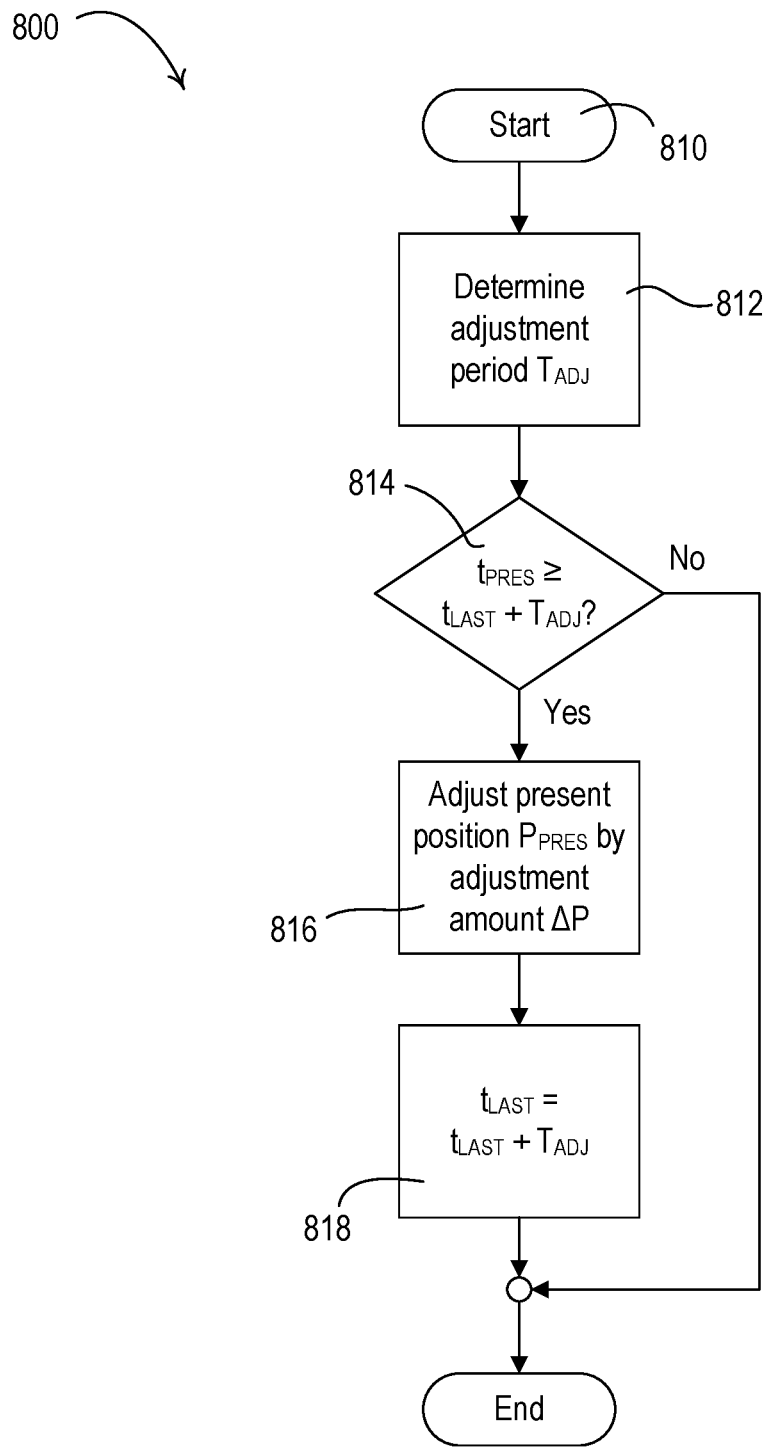
FIG. 8 is a flowchart of an example control procedure for adjusting a target position for a covering material of a motorized window treatment.

FIG. 8 is a flowchart of an example control procedure 800 for adjusting a target position $P_{TRGT}$ for a covering material of a motorized window treatment (e.g., the motorized window treatments 150 shown in FIG. 1 and/or the motorized window treatment 200 shown in FIG. 2). For example, the control procedure 800 may be executed by a control circuit of a motor drive unit (e.g., the control circuit 320 of the motor drive unit 300 shown in FIG. 3) of the motorized window treatment. The control procedure 800 may be executed as part of a target position routine (e.g., the target position routine 324) of the control circuit. The control circuit may execute the control procedure 800 after receiving a message including a command to which the control circuit may be responsive. For example, the message may include a command for adjusting a present position $P_{PRES}$ of the covering material to a destination position $P_{DEST}$. The control circuit may execute the control procedure 800 periodically at 810 (e.g., at an operating period Top) while the control circuit is adjusting the target position $P_{TRGT}$ (e.g., to adjust the present position $P_{PRES}$) of the covering material from a starting position $P_{START}$ towards the destination position $P_{DEST}$. The control circuit may be configured to keep track of a present time $t_{PRES}$ (e.g., a relative time) to determine to execute procedures and/or perform events.

At 812, the control circuit may determine an adjustment period $T_{ADJ}$ at which to adjust the target position $P_{TRGT}$. For example, the control circuit may adjust the target position $P_{TRGT}$ by an adjustment amount ΔP to adjust the present position $P_{PRES}$ of the covering material at the nominal rate INOM. The adjustment period $T_{ADJ}$ may represent a desired time period between adjustments of the target position $P_{TRGT}$ by the adjustment amount ΔP to adjust the present position $P_{PRES}$ of the covering material at the nominal rate INOM. The length of the adjustment period $T_{ADJ}$ may be greater than the length of the operating period Top. For example, when the control circuit is adjusting the target position $P_{TRGT}$ at a constant rate (e.g., at the nominal rate INOM) between the starting position $P_{START}$ and the destination position $P_{DEST}$, the adjustment period $T_{ADJ}$ may have a constant length (e.g., equal to a nominal period $T_{NOM}$) from one execution of the procedure 800 to the next. In addition, the adjustment period $T_{ADJ}$ may vary from one execution of the procedure 800 to the next when the control circuit is adjusting the target position $P_{TRGT}$ to take into account the variable thickness of the covering material wrapped around the roller tube. For example, the control circuit may retrieve a present value of the adjustment period $T_{ADJ}$ from memory based on the present position $P_{PRES}$ of the covering material each time that the procedure 800 is executed.

While the control circuit is adjusting the target position $P_{TRGT}$ (e.g., to thus adjust the present position $P_{PRES}$ of the covering material), the control circuit may keep track of a time $t_{LAST}$ at which the target position $P_{TRGT}$ for the covering material was last adjusted. At 814, the control circuit may then determine if the present time $t_{PRES}$ is greater than or equal to the time $t_{LAST}$ at which the target position $P_{TRGT}$ was last adjusted plus the adjustment period $T_{ADJ}$. When the present time $t_{PRES}$ is not greater than or equal to the time $t_{LAST}$ at which the target position $P_{TRGT}$ was last adjusted plus the adjustment period $T_{ADJ}$ at 814 (e.g., it is not time to adjust the target position $P_{TRGT}$), the control procedure 800 may end.

When the present time $t_{PRES}$ is greater than or equal to the time $t_{LAST}$ at which the target position $P_{TRGT}$ was last adjusted plus the adjustment period $T_{ADJ}$ at 814, the control circuit may adjust the target position $P_{TRGT}$ by the adjustment amount $\Delta P$ at 816. For example, the control circuit may increase and/or decrease the target position $P_{TRGT}$ by the adjustment amount $\Delta P$ at 816 depending on the direction of rotation of the motor (e.g., whether the control circuit is raising or lowering the present position $P_{PRES}$ of the covering material), e.g., $$P_{TRGT}=P_{TRGT}+\Delta P, \text{ or}$$

$$P_{TRGT}=P_{TRGT}-\Delta P.$$

At 818, the control circuit may update the time $t_{LAST}$ at which the target position $P_{TRGT}$ was last adjusted by adding the adjustment period $T_{ADJ}$ to the time $t_{LAST}$ at which the target position $P_{TRGT}$ was last adjusted, e.g., $$t_{LAST}=t_{LAST}+T_{ADJ},$$

and the control procedure 800 may end.

When the covering material is synchronized with the covering materials of other motorized window treatments, the control circuit may execute the control procedure 800 (e.g., at 614 of the control procedure 600 shown in FIG. 6) to adjust the present position $P_{PRES}$ at the nominal rate INOM. The time $t_{LAST}$ at which the target position $P_{TRGT}$ was last adjusted may be initialized to the present time $t_{PRES}$ (e.g., at 714 of the control procedure 700 shown in FIG. 7) when the covering materials are synchronized. When the control circuit first executes the control procedure 800, the present time $t_{PRES}$ may not be greater than the time $t_{LAST}$ at which the target position $P_{TRGT}$ was last adjusted plus the adjustment period $T_{ADJ}$ at 814 (since control procedure 800 may be executed at the operating period Top which may be less than the adjustment period $T_{ADJ}$), and the control procedure 800 may end without adjustment of the target position $P_{TRGT}$. The control circuit may continue to periodically execute the control procedure 800 at the operating period Top until the present time $t_{PRES}$ is greater than or equal to the time $t_{LAST}$ at which the target position $P_{TRGT}$ was last adjusted plus the adjustment period $T_{ADJ}$ at 814, at which time the control circuit may adjust the target position $P_{TRGT}$ by the adjustment amount $\Delta P$ at 816 and add the adjustment period $T_{ADJ}$ to the time $t_{LAST}$ at which the target position $P_{TRGT}$ was last adjusted at 818. The control circuit may continue to periodically execute the control procedure 800 until the present position $P_{PRES}$ of the covering material equal the destination position $P_{DEST}$.

When the covering material is not synchronized with the covering materials of other motorized window treatments, the control circuit may execute the control procedure 800 (e.g., at 622 of the control procedure 600 shown in FIG. 6) to adjust the present position $P_{PRES}$ at the increased rate $r_{INC}$. When the covering materials are synchronized, the time $t_{LAST}$ at which the target position $P_{TRGT}$ was last adjusted may be initialized to the present time $t_{PRES}$ minus a delay period $T_{DELAY}$ (e.g., at 724 of the control procedure 700 shown in FIG. 7), for example, to load a relatively large error into the time $t_{LAST}$ at which the target position $P_{TRGT}$ was last adjusted. Since the delay period $T_{DELAY}$ may be greater than the adjustment period $T_{ADJ}$ (e.g., and thus the present time $t_{PRES}$ may be less than the time $t_{LAST}$ at which the target position $P_{TRGT}$ was last adjusted plus the adjustment period $T_{ADJ}$) at 814 when operating at the increased rate $r_{INC}$ and the control procedure 800 is first executed, the control circuit may adjust (e.g., immediately adjust) the target position $P_{TRGT}$ by the adjustment amount $\Delta P$ at 816 and add the adjustment period $T_{ADJ}$ to the time $t_{LAST}$ at which the target position $P_{TRGT}$ was last adjusted at 818. As the control circuit continues to adjust the present position $P_{PRES}$ of the covering material at the increased rate $r_{INC}$, the present time $t_{PRES}$ may continue to be less than the time $t_{LAST}$ at which the target position $P_{TRGT}$ was last adjusted plus the adjustment period $T_{ADJ}$ at 814, such that the control circuit continues to adjust the target position $P_{TRGT}$ by the adjustment amount $\Delta P$ at 816 during each operating period Top. In addition, during each operating period Top, the control circuit may continue to add the adjustment period $T_{ADJ}$ to the time $t_{LAST}$ at which the target position $P_{TRGT}$ was last adjusted at 818. Since the adjustment period $T_{ADJ}$ may be greater than the operating period Top, the time $t_{LAST}$ at which the target position $P_{TRGT}$ was last adjusted may continue to move closer to the present time $t_{PRES}$ as the control circuit continues to adjust the present position $P_{PRES}$ of the covering material at the increased rate $r_{INC}$. The covering material may be synchronized with the covering material of other motorized window treatments when the present time $t_{PRES}$ is greater than or equal to the time $t_{LAST}$ at which the target position $P_{TRGT}$ was last adjusted plus the adjustment period $T_{ADJ}$ at 814. At this time, the control circuit may stop adjusting the target position $P_{TRGT}$ by the adjustment amount $\Delta P$ during each operation period TOP, such that the present position $P_{PRES}$ of the covering material may be adjusted at the nominal rate INOM. The control circuit may continue to periodically execute the control procedure 800 to adjust the present position $P_{PRES}$ of the covering material at the nominal rate INOM (e.g., as described above) until the present position $P_{PRES}$ of the covering material equal the destination position $P_{DEST}$.

Although features and elements may be described herein in particular combinations, each feature or element may be used alone or in any combination with the other features and elements. While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A motor drive unit for a motorized window treatment of a load control system, the motorized window treatment having a roller tube and a covering material that is attached to the roller tube and operable between a raised position and a lowered position via rotation of the roller tube, the motor drive unit comprising:
   a motor configured to rotate the roller tube to adjust a present position of the covering material between the raised position and the lowered position;
   a communication circuit configured to receive wireless signals;
   a control circuit configured to receive a message including a command via the wireless signals received by the communication circuit, the control circuit configured to control the motor to adjust the present position of the covering material at a first rate in response to the command;
   wherein the control circuit is further configured to:
   determine that an adjustment of the covering material in response to the command is delayed with respect to other motorized window treatments of the load control system;
   determine a delay time between when the other motorized window treatments began to adjust the covering material and when the motor drive unit will begin to adjust the covering material in response to the command in the received message;
   adjust the present position of the covering material at an increased rate in response to determining that the adjustment of the covering material in response to the command is delayed;
   determine that the covering material is synchronized with the other motorized window treatments using the determined delay time; and
   adjust the present position of the covering material at a second rate that is less than the increased rate in response to determining that the covering material is synchronized with the other motorized window treatments.

2. The motor drive unit of claim 1, further comprising:
   a motor drive circuit configured to adjust a rotational speed and direction of the motor; and
   a rotational position sensing circuit configured to generate one or more sense signals configured to indicate the rotational speed and a direction of the motor;
   wherein the control circuit is configured to determine a sensed position of the covering material in response to the one or more sense signals generated by the rotational position sensing circuit, the sensed position indicating the present position of covering material, the control circuit configured to control the motor drive circuit to adjust the present position of the covering material towards a target position in response to the sensed position of the covering material determined from the one or more sense signals.

3. The motor drive unit of claim 2, wherein the control circuit is configured to adjust the target position with respect to time while controlling the motor to adjust the present position of the covering material.

4. The motor drive unit of claim 3, wherein, each time that the control circuit adjusts the target position while controlling the motor to adjust the present position of the covering material to the destination position, the control circuit is configured to adjust the target position by a predetermined adjustment amount.

5. The motor drive unit of claim 4, wherein the control circuit is configured to periodically execute a control procedure at an operating period while the control circuit is adjusting the present position of the covering material towards the destination position, and
   wherein, during the control procedure, the control circuit is configured to:
   keep track of a time at which the control circuit last adjusted the target position;
   determine whether to adjust the target position based on an adjustment period that is greater than the operating period; and
   adjust the present position by the predetermined adjustment amount when a present time is greater than or equal to the time at which the control circuit last adjusted the target position plus the adjustment period.

6. The motor drive unit of claim 5, wherein, when the control circuit has determined that adjustment of the covering material in response to the command is delayed with respect to other motorized window treatments of the load control system, the control circuit is configured to initialize the time at which the control circuit last adjusted the target position to be equal to the present time minus the determined time delay.

7. The motor drive unit of claim 6, wherein, when adjusting the present position of the covering material at the increase rate, the control circuit is configured to adjust the present position by the predetermined adjustment amount during each execution of the control procedure until the present time is less than the time at which the control circuit last adjusted the target position plus the adjustment period.

8. The motor drive unit of claim 6, wherein, when adjusting the present position of the covering material at the increase rate, the control circuit is configured to determine that the covering material is synchronized with the other motorized window treatments using the determined delay time by determining that the present time is less than the time at which the control circuit last adjusted the target position plus the adjustment period.

9. The motor drive unit of claim 5, wherein, when the control circuit has determined that adjustment of the covering material in response to the command is not delayed with respect to other motorized window treatments of the load control system, the control circuit is configured to initialize the time at which the control circuit last adjusted the target position to be equal to the present time.

10. The motor drive unit of claim 5, wherein the control circuit is configured to keep track of the time at which the control circuit last adjusted the target position by adding the adjustment period to the time at which the control circuit last adjusted the target position.

11. The motor drive unit of claim 4, wherein the adjustment period varies with respect to the present position of the covering material.

12. The motor drive unit of claim 1, wherein the control circuit is configured to periodically wake up from a sleep state to determine whether any messages are being transmitted via the wireless signals, wherein the messages are transmitted periodically during a transmission event, and each of the messages includes the same command to adjust the present position of the covering material to a destination position.

13. The motor drive unit of claim 12, wherein, when one of a first number of the transmitted messages of the transmission event is received by the communication circuit, the control circuit is configured to begin controlling the motor to adjust the present position towards the destination position at the first rate at a coordinated action time to coordinate adjustment of the covering material with the other motorized window treatments of the load control system.

14. The motor drive unit of claim 13, wherein the control circuit is configured to determine the coordinated action time such that the coordinated action time is after a predetermined message of the transmission event and before a subsequent message of the transmission event, and wherein the predetermined message is the last message of the first number of the transmitted messages of the transmission event.

15. The motor drive unit of claim 14, wherein, when a message is received after the coordinated action time, the control circuit is configured to begin controlling the motor to adjust the present position towards the destination position at the increased rate at a delayed action time after the message is received.

16. The motor drive unit of claim 15, wherein the control circuit is configured to determine that adjustment of the covering material in response to the command is delayed with respect to other motorized window treatments of the load control system when a sequence number of the received message is greater than a sequence number of the predetermined message of the transmission event.

17. The motor drive unit of claim 16, wherein the sequence number of the predetermined message of the transmission event is equal to the first number of the transmitted messages of the transmission event.

18. The motor drive unit of claim 16, wherein the control circuit is configured to determine the delay time by subtracting the sequence number of the predetermined message of the transmission event from a sequence number of the received message.

19. The motor drive unit of claim 13, wherein the control circuit is configured to determine that adjustment of the covering material in response to the command is delayed with respect to other motorized window treatments of the load control system when one of the first number of the transmitted messages of the transmission event is not received by the communication circuit.

20. The motor drive unit of claim 13, wherein the control circuit is configured to determine that the covering material is synchronized with the other motorized window treatments using the determined delay time, and adjust the present position of the covering material at the first rate in response to determining that the covering material is synchronized with the other motorized window treatments.

21. The motor drive unit of claim 13, wherein the control circuit is configured to determine the coordinated action time based on the first number of the transmitted messages of the transmission event.

22. The motor drive unit of claim 1, wherein the control circuit is configured to:
    prior to adjusting the present position of the covering material at the increased rate, determine a length of a synchronization period from when the control circuit will begin to adjust the covering material in response to the command in the received message to when the covering material will be synchronized with the other motorized window treatments; and
    determine that the covering material is synchronized with the other motorized window treatments when a time period since the control circuit began to adjust the covering material at the increased rate is greater than or equal to the synchronization period.

23. The motor drive unit of claim 22, wherein the control circuit is configured to calculate the length of a synchronization period using the delay time and the values of the first rate and the increased rate.

24. The motor drive unit of claim 22, wherein the control circuit is configured to determine that the covering material is synchronized with the other motorized window treatments by starting a timer when the control circuit begins to adjust the covering material, and determining when a value of the timer exceeds the synchronization period.

25. The motor drive unit of claim 1, wherein the control circuit is configured to:
    prior to adjusting the present position of the covering material at the increased rate, determine a synchronization position at which the covering material will be synchronized with the other motorized window treatments; and
    determine that the covering material is synchronized with the other motorized window treatments when the present position is equal to the synchronization position.

26. The motor drive unit of claim 25, wherein the control circuit is configured to calculate a synchronization position using a starting position of the covering material, the delay time, and the values of the first rate and the increased rate.

27. The motor drive unit of claim 1, wherein the second rate is equal to the first rate.

* * * * *